US012497551B2

(12) United States Patent
Kramer et al.

(10) Patent No.: US 12,497,551 B2
(45) Date of Patent: Dec. 16, 2025

(54) HEAT TRANSFER FLUIDS COMPRISING METHYL PARAFFINS DERIVED FROM LINEAR ALPHA OLEFIN DIMERS AND USE THEREOF

(71) Applicant: ExxonMobil Chemical Patents Inc., Baytown, TX (US)

(72) Inventors: Anatoly I. Kramer, Baytown, TX (US); Jorg F. W. Weber, Houston, TX (US); Jennifer L Rapp, Houston, TX (US); Kyle G. Lewis, Houston, TX (US); Patrick C. Chen, Houston, TX (US); Behrouz Engheta, Hamburg (DE); Heinrich R. Braun, Tiefenbach (DE); Babak Lotfizadehdehkordi, Houston, TX (US); Tobias Klande, Winsen (DE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 776 days.

(21) Appl. No.: 17/596,598

(22) PCT Filed: Jun. 25, 2020

(86) PCT No.: PCT/US2020/039608
§ 371 (c)(1),
(2) Date: Dec. 14, 2021

(87) PCT Pub. No.: WO2020/264154
PCT Pub. Date: Dec. 30, 2020

(65) Prior Publication Data
US 2022/0267658 A1     Aug. 25, 2022

Related U.S. Application Data

(60) Provisional application No. 62/885,091, filed on Aug. 9, 2019, provisional application No. 62/867,599, filed on Jun. 27, 2019.

(30) Foreign Application Priority Data

Apr. 9, 2020   (EP) .................................. 19197682

(51) Int. Cl.
*C09K 5/10*      (2006.01)
*C10M 169/04*    (2006.01)

(52) U.S. Cl.
CPC ............ *C09K 5/10* (2013.01); *C10M 169/04* (2013.01)

(58) Field of Classification Search
CPC .............................. C09K 5/10; C10M 169/04
See application file for complete search history.

(56) References Cited

U.S. PATENT DOCUMENTS

| 1,815,022 | A | 7/1931 | Davis |
| 2,015,748 | A | 10/1935 | Frolich |

(Continued)

FOREIGN PATENT DOCUMENTS

| WO | 02/097017 A1 | 12/2002 |
| WO | 2011/113851 A1 | 9/2011 |

(Continued)

OTHER PUBLICATIONS

Extended European Search Report received for European Patent Application No. 19206405.3 mailed on May 7, 2020, 6 Pages.

(Continued)

*Primary Examiner* — Andrew J. Oyer

(57) ABSTRACT

Methyl paraffins formed by hydrogenating one or more LAO dimers comprising a vinylidene moiety or a trisubstituted olefin moiety may have advantageous heat transfer properties, particularly when incorporated within an electric vehicle. For example, methyl paraffins produced upon hydrogenating LAO dimers formed from one or more $C_6$-$C_{12}$ LAOS, particularly in the presence of a Hf metallocene catalyst system, may contain 12-24 carbon atoms, (Continued)

and collectively have a flash point of about 130° C. or above, a pour point of about −42° C. or lower, a thermal conductivity at 80° C. of about 0.165 W/m·K or higher, and a Mouromtseff number ranging from about 17,000 to about 27,000 kg/(s$^{2.2}$·m$^{0.6}$·K) at 80° C. Heat transfer fluids comprising such methyl paraffins may be placed in contact with a heat-generating component, such as a battery and/or motor of an electric vehicle, or within a similar type of battery system, including immersive configurations for a battery.

20 Claims, 3 Drawing Sheets

(56) References Cited

U.S. PATENT DOCUMENTS

| | | | |
|---|---|---|---|
| 2,191,498 | A | 2/1940 | Reiff |
| 2,387,501 | A | 10/1945 | Dietrich |
| 2,655,479 | A | 10/1953 | Munday et al. |
| 2,666,746 | A | 1/1954 | Munday et al. |
| 2,721,877 | A | 10/1955 | Popkin et al. |
| 2,721,878 | A | 10/1955 | Popkin |
| 3,197,405 | A | 7/1965 | Suer |
| 3,250,715 | A | 5/1966 | Wyman |
| 4,016,245 | A | 4/1977 | Plank et al. |
| 4,076,842 | A | 2/1978 | Plank et al. |
| 4,556,477 | A | 12/1985 | Dwyer |
| 4,658,078 | A | 4/1987 | Slaugh et al. |
| 4,798,684 | A | 1/1989 | Salomon |
| 4,827,064 | A | 5/1989 | Wu |
| 4,827,073 | A | 5/1989 | Wu |
| 4,956,122 | A | 9/1990 | Watts et al. |
| 4,973,788 | A | 11/1990 | Lin et al. |
| 5,084,197 | A | 1/1992 | Galic et al. |
| 5,087,788 | A | 2/1992 | Wu |
| 5,246,566 | A | 9/1993 | Miller |
| 5,625,105 | A | 4/1997 | Lin et al. |
| 5,817,899 | A * | 10/1998 | Hope ............... C10M 107/10 585/16 |
| 6,080,301 | A | 6/2000 | Berlowitz et al. |
| 6,090,989 | A | 7/2000 | Trewella et al. |
| 6,165,949 | A | 12/2000 | Berlowitz et al. |
| 6,479,722 | B1 | 11/2002 | De et al. |
| 7,129,197 | B2 | 10/2006 | Song et al. |
| 7,704,930 | B2 | 4/2010 | Deckman et al. |
| 9,688,792 | B2 | 6/2017 | Welle et al. |
| 10,654,766 | B2 | 5/2020 | Chen et al. |
| 11,084,894 | B2 | 8/2021 | Yang et al. |
| 11,180,709 | B2 | 11/2021 | Emett et al. |
| 11,680,121 | B2 | 6/2023 | Yang et al. |
| 12,162,968 | B2 | 12/2024 | Yang et al. |
| 2012/0264661 | A1 | 10/2012 | Tsubouchi |
| 2013/0090273 | A1 | 4/2013 | Martin et al. |
| 2015/0135742 | A1 | 5/2015 | Rousseau et al. |
| 2018/0282359 | A1 | 10/2018 | Crowther et al. |
| 2018/0371348 | A1 | 12/2018 | Oumar-Mahamat et al. |

FOREIGN PATENT DOCUMENTS

| | | |
|---|---|---|
| WO | 2016/157958 A1 | 10/2016 |
| WO | 2016/157960 A1 | 10/2016 |
| WO | 2017/001487 A1 | 1/2017 |
| WO | 2018/175047 A1 | 9/2018 |
| WO | 2020/264154 A1 | 12/2020 |

OTHER PUBLICATIONS

Lenert, A. et al., (2012) "Heat Transfer Fluids", Annual Review of Heat Transfer, vol. 15, 58 Pages.

Mouromtseff, I. E., (1942) "Water and forced-air cooling of vacuum tubes nonelectronic problems in electronic tubes", Proceedings of the IRE, vol. 30, No. 4, pp. 190-205.

International Preliminary Report on Patentability received for PCT Application No. PCT/US2020/039608, mailed on Jan. 6, 2022, 7 Pages.

International Search Report and Written Opinion received for PCT Application No. PCT/US2020/039608, mailed on Oct. 7, 2020, 11 Pages.

\* cited by examiner

HEAT TRANSFER FLUIDS COMPRISING METHYL PARAFFINS DERIVED FROM LINEAR ALPHA OLEFIN DIMERS AND USE THEREOF

CROSS-REFERENCE TO RELATED APPLICATIONS

This application is a National Phase Application claiming priority to PCT Application Serial No. PCT/US2020/039608 filed Jun. 25, 2020, which claims the benefit of Provisional Application No. 62/885,091, filed Aug. 9, 2019, Provisional Application No. 62/867,599, filed Jun. 27, 2019 and European Application No. 19197682.8, filed Apr. 9, 2020, the disclosures of which are incorporated by reference herein by their reference.

FIELD

The present disclosure relates to heat transfer fluids for electric vehicles and methods for their production and use.

BACKGROUND

In the electric vehicle industry, numerous advances in battery technology have been made in recent years to promote greater power delivery and decreased charging frequency. Among the advancements needed to progress electric vehicle technology further is the development of more effective cooling systems for promoting heat transfer from various electric vehicle (EV) components. Particular components of electric vehicles that may be in need of improved heat transfer include, for example, one or more batteries, axles, EV power electronics, and/or an electric motor. Rapid charging stations for electric vehicles may similarly be in need of efficient cooling. While the components of an electric vehicle may be cooled to varying degrees using conventional jacketed cooling fluids and technology, such as aqueous glycol solutions also used in conjunction with internal combustion engines, effective cooling of the batteries of an electric vehicle through direct cooling fluid contact represents an entirely different challenge.

All batteries generate heat as they charge or discharge. The more rapid the rate of charge or discharge becomes, the greater the amount of heat generated per unit time. For small batteries, exposure to ambient atmosphere may effectively dissipate the discharged heat, such that separate cooling systems are not required. In electric vehicles, the large battery size and the rapid discharge rates needed to ensure satisfactory vehicle performance make heat dissipation much more of a concern. Likewise, rapid battery charging at electric vehicle recharging stations may also result in significant battery heating and present similar thermal management issues.

In addition to influencing or governing vehicle performance, battery temperatures outside a preferred operating range, typically from about 15° C. to 35° C. for lithium-ion batteries, may negatively impact the battery's performance. Internal temperature gradients between the various cells of a battery may similarly impact the battery's performance. In addition to poor battery or vehicle performance, operating a battery outside a preferred temperature range and/or with an internal thermal gradient may increase the risk for battery failure, runaway overheating, fire and/or explosion. Therefore, effective thermal management during battery charge or discharge and vehicle operation may become a limiting factor in how much the performance of electric vehicles may be further advanced.

In cold climates, conventional 12 V lead-acid batteries may be used for heating lithium-ion batteries in order to bring the lithium-ion battery into a more favorable operating temperature range. For example, current operating guidelines given to electric vehicle owners in cold climates include turning on the vehicle headlights and/or the rear defroster when the electric vehicle has not been operating and the temperature is below 0° C. Effective thermal management may still be needed during charging or discharging cycles once the battery has reached a suitable operating temperature.

Current strategies for cooling the batteries of an electric vehicle may employ one or more of a phase change material, heat dissipation fins, or air cooling. Each of these approaches may have significant limitations, either in terms of the quantity of heat they are able to dissipate directly from the battery and/or due to their impact upon vehicle performance. Heat dissipation fins, for example, introduce excess weight that must be carried by the vehicle as it travels, thereby lowering the vehicle's efficiency and performance.

Cooling systems employing a heat transfer fluid are another heat dissipation strategy that may be employed for batteries and other heat-generating components of electric vehicles. Since fluids may exhibit higher thermal conductivity and heat capacity values than does air, fluids may promote more effective heat dissipation from a battery or other heat-generating component than do other heat dissipation strategies. Moreover, a fluid may be placed in direct surface contact with a battery, electric motor or other heat-generating component to promote optimal heat transfer, including configurations in which the heat-generating component is partially or fully immersed in the heat transfer fluid. Alternately, a suitable heat transfer fluid may be jacketed around and/or circulated through a heat-generating component, such as a battery or EV power component. While immersion or partial immersion of a heat-generating component in a heat transfer fluid may afford optimal heat transfer, many heat transfer fluids presently in common use are unsuitable for immersion of batteries and/or electric motors therein due to electrical conductivity of the fluid. Aqueous heat transfer fluids, such as aqueous glycol solutions, for example, may be unsuitable for immersion of a battery or electric motor due to shorting and battery or motor failure that may occur when the heat transfer fluid contacts the battery's leads or various electrical components in the motor. Fluorocarbon fluids may meet certain performance requirements for suitable heat transfer fluids, including satisfactory pour point values and flash point values, but fumes from burning of the fluids may lead to undesirable health and environmental effects. Cooling efficiency of a particular heat transfer fluid may be approximated by the Mouromtseff Number, which has been used in the electronics industry to aid in selection of heat transfer fluids having suitable cooling properties. To date, suitable insulating heat transfer fluids having acceptable heat transfer characteristics in combination with an acceptable flash point, pour point and health/environmental profile have yet to be identified.

SUMMARY

In some embodiments, the present disclosure provides heat transfer fluids comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.

In other embodiments, the present disclosure provides battery systems comprising a heat transfer fluid. The battery systems comprise a battery and a heat transfer fluid in contact with the battery. The heat transfer fluids comprise one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.

In still other embodiments, the present disclosure provides electric vehicles comprising a heat-generating component, and a heat transfer fluid in contact with the heat-generating component. The heat transfer fluids comprise one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.

In yet still other embodiments, the present disclosure provides thermal management methods comprising providing a heat transfer fluid, and operating a heat-generating component in contact with the heat transfer fluid. The heat transfer fluid comprises one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.

In some embodiments, the present disclosure provides heat transfer fluids comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower. In particular examples, the one or more LAO dimers may be formed in the presence of an unbridged Hf metallocene catalyst system.

In other embodiments, the present disclosure provides battery systems comprising a heat transfer fluid. The battery systems comprise a battery and a heat transfer fluid in contact with the battery. The heat transfer fluids comprise one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower. In particular examples, the one or more LAO dimers may be formed in the presence of an unbridged Hf metallocene catalyst system.

In still other embodiments, the present disclosure provides electric vehicles comprising a heat-generating component, and a heat transfer fluid in contact with the heat-generating component. The heat transfer fluids comprise one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower. In particular examples, the one or more LAO dimers may be formed in the presence of an unbridged Hf metallocene catalyst system.

In yet still other embodiments, the present disclosure provides thermal management methods comprising providing a heat transfer fluid, and operating a heat-generating component in contact with the heat transfer fluid. The heat transfer fluid comprises one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower. In particular examples, the one or more LAO dimers may be formed in the presence of an unbridged Hf metallocene catalyst system.

BRIEF DESCRIPTION OF THE DRAWING

The following figure is included to illustrate certain aspects of the present disclosure, and should not be viewed as an exclusive embodiment. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
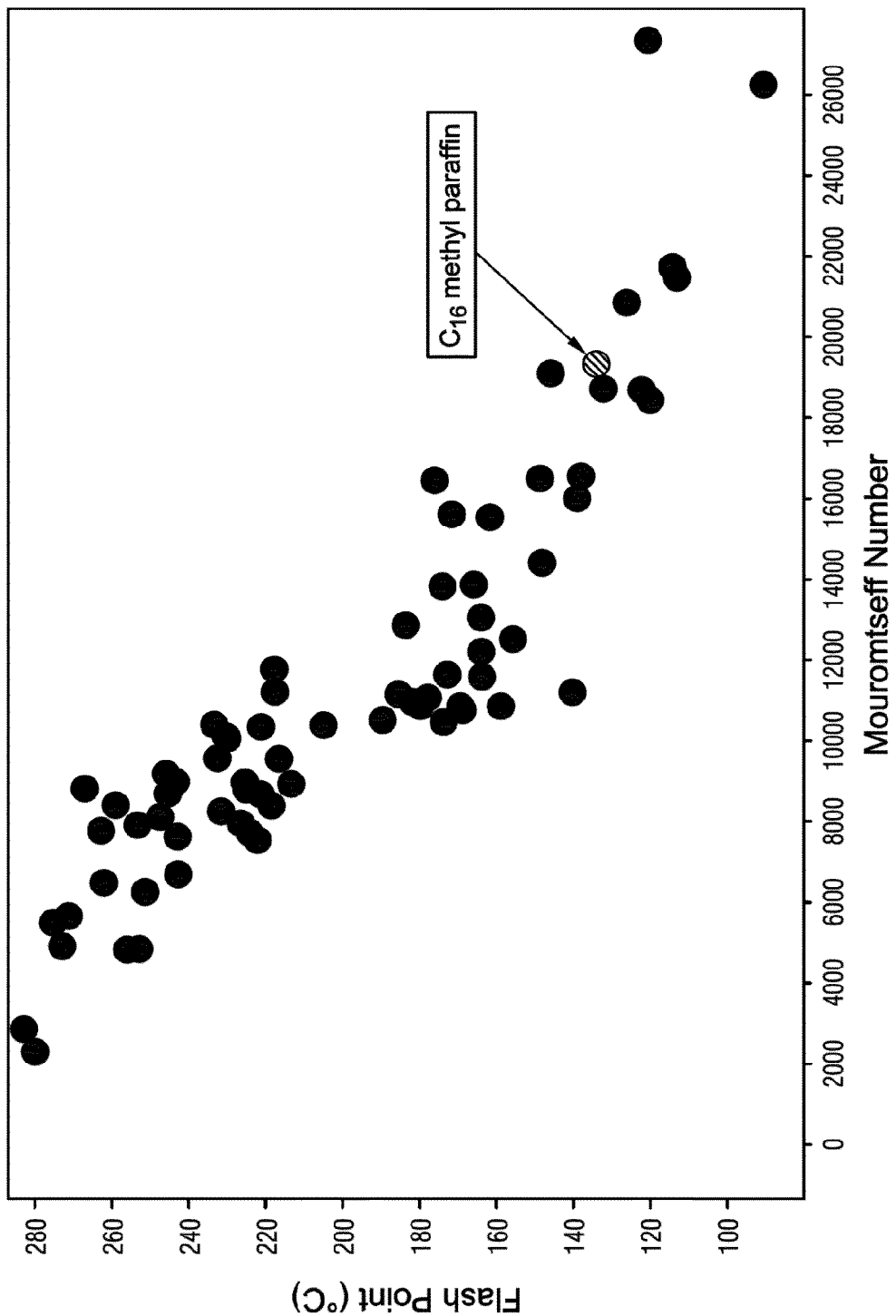
FIG. 1 shows a plot of flash point versus Mouromtseff Number at 80° C. for various heat transfer fluids.

The present disclosure relates to thermal management and, more specifically, to cooling systems for electric vehicles or other heat-generating components, in which the cooling systems employ a methyl paraffin-based heat transfer fluid with a low pour point and methods related thereto.

As discussed above, effective thermal management in electric vehicles can be challenging, particularly with respect to cooling systems designed for maintaining the batteries or other electrical components of an electric vehicle in a desired operating temperature range, such as from about 15° C. to about 35° C. in the case of lithium-ion batteries, while also preserving vehicle performance and high operational efficiency. Without effective thermal management, catastrophic battery and/or vehicle failure may occur. For example, at a battery temperature above about 140° C., a runaway reaction may occur without effectively cooling. To provide an adequate operating safety margin, a maximum operating temperature of about 70° C. may be used in some instances, and even then over short time periods. If a runaway reaction results due to inadequate cooling and/or cooling system failure, the battery temperature may jump to approximately 700° C., resulting in a fire. Cooling systems utilizing heat transfer fluids offer the best thermal management performance to date, but many heat transfer fluids, such as aqueous glycol solutions, are unsuitable for direct immersion of a battery or electric motor therein due to the fluid's electrical conductivity, thereby limiting the amount of heat transfer that may take place. Accordingly, further technological advancement of electric vehicles may be limited by performance shortcomings of existing heat transfer fluids.

The present disclosure demonstrates that certain abundant products of the chemical and petroleum industries may be suitable precursors for forming heat transfer fluids having good thermal management performance and other properties that are highly compatible for use in conjunction with batteries that are currently used in electric vehicles. More specifically, linear alpha olefins (LAOs) may serve as a precursor for forming one or more LAO dimers comprising a vinylidene moiety or a trisubstituted olefin moiety, which may then be further hydrogenated to form the corresponding methyl paraffins as a reaction product. LAO dimers comprising a vinylidene moiety or a trisubstituted olefin moiety may be formed in various ratios using several different types of metallocene catalysts, as discussed further herein. Advantageously, both types of LAO dimers lead to related types of methyl paraffins following hydrogenation. Depending on the ratio of vinylidene olefins to trisubstituted olefins that undergoes hydrogenation, slightly different heat transfer properties may be obtained. Methyl paraffins formed by hydrogenating an LAO dimer comprising a vinylidene moiety or a trisubstituted olefin moiety using the catalysts disclosed below and having about 12 to about 24 carbon atoms in total may possess a desirable combination of acceptably high flash points, low pour points, and cooling efficiency (approximated by the Mouromtseff Number at 80° C.), as discussed further below. Mouromtseff Numbers obtained at other temperatures may be more indicative of the cooling efficiencies attainable at other operating temperatures. Flash points above about 135° C. or above 140° C. and pour points of about −40° C., typically about −38° C. to about −44° C. (i.e., as low as −44° C.), may be realized by utilizing bridged or unbridged Zr metallocene catalyst systems to form the one or more LAO dimers. Even lower pour points of about −42° C. or about −45° C. to about −51° C. (i.e., as low as −51° C.) may be realized using unbridged Hf metallocene catalyst systems, as discussed further herein. In some instances, somewhat higher pour points of about −42° C. or below may be obtained through use of unbridged Hf metallocene catalysts, but lower pour points may preferably be obtained. Blends of different methyl paraffins having total carbon counts in the foregoing range may be readily formulated as well in order to afford further tailoring of the flash point, pour point and/or cooling efficiency in some cases. Methyl paraffin blends may be synthesized directly via hydrogenation of an appropriate mixture of LAO dimers in a desired ratio, or different methyl paraffins may be combined with one another in a desired ratio following hydrogenation. Heat transfer fluids containing predominantly $C_{16}$ methyl paraffins and optionally one or more $C_{18}$-$C_{24}$ or $C_{18}$-$C_{30}$ methyl paraffins in combination with the $C_{16}$ methyl paraffins may be particularly advantageous with respect to the collective Mouromtseff Number produced. Other components may be included in the heat transfer fluids of the present disclosure as well, as needed to modify any of the flash point, pour point, cooling efficiency, or other performance property.

Methyl paraffins formed by hydrogenating one or more LAO dimers containing a vinylidene moiety or a trisubstituted olefin moiety and having about 12 to about 24 carbon atoms in total may provide heat transfer fluids having properties that are particularly compatible with the operating conditions of a battery or other component in an electric vehicle. Lithium-ion batteries currently used in electric vehicles have a practical operating temperature limit of about 70° C., well below the failure temperature of about 140° C., above which a runaway reaction leading to failure of the battery may occur. The flash points of methyl paraffins formed by hydrogenating one or more LAO dimers having about 12 to about 24 carbon atoms in total, particularly about 16 to about 24 carbon atoms in total, may collectively be in the range of about 130° C. to about 150° C., depending on metallocene catalyst used to form the one or more LAO dimers, which are compatible with keeping a battery below the typical failure temperature. For example, methyl paraffins formed by hydrogenating a $C_{16}$ LAO dimer (formed by dimerization of a $C_8$ LAO using a Zr metallocene catalyst system) may have a flash point of about 135° C. Methyl paraffins formed by hydrogenating a $C_{16}$ LAO dimer (formed by dimerization of a $C_8$ LAO using a Hf metallocene catalyst system) may have a slightly lower flash point of about 133° C. As such, minimal blending with other components may be needed to modify the flash point, particularly to raise the flash point, when employing the methyl paraffins disclosed herein as a heat transfer fluid for use in electric vehicles. Namely, the flash points of the methyl paraffins are already highly compatible with the maximum operating temperature of electric vehicle batteries. Higher flash points are possible using heavier methyl paraffins (e.g., $C_{18}$-$C_{24}$ methyl paraffins, or even methyl paraffins up to $C_{30}$), but the flash point and Mouromtseff Number frequently tend to correlate inversely with one another; when one goes up the other goes down. There may be exceptions to this correlation. Because of the inverse relationship frequently exhibited between flash point and Mouromtseff Number for methyl paraffins and other molecules, it has been difficult heretofore to identify heat transfer fluids exhibiting both a high Mouromtseff Number and flash point that is suitably high, each in combination with low electrical conductivity. As mentioned previously, methyl paraffins having a different number of total carbon atoms compared to a predominant methyl paraffin may be employed to regulate the flash point of the heat transfer fluids, if desired. For example, the flash point of a $C_{16}$ methyl paraffin may be increased by incorporating an effective amount of a $C_{20}$ or $C_{24}$ methyl paraffin (formed by dimerization of a $C_{10}$ or $C_{12}$ LAO followed by hydrogenation, respectively) and/or a $C_{18}$ or $C_{22}$ methyl paraffin (formed by dimerization of a $C_8/C_{10}$ or $C_{10}/C_{12}$ LAO mixture followed by hydrogenation, respectively), if desired, provided that the effective amount does not lower the Mouromtseff Number too much. Other components may also be used in an effective amount to regulate the flash points and/or pour points of the heat transfer fluids to a desired degree. Molecular structure variations of the methyl paraffins may also impact the flash points and/or pour points to varying degrees. Indeed, the surprising pour point variance between methyl paraffins produced from LAO dimers prepared under Hf metallocene catalysis compared to those produced under Zr metallocene catalysis is indicative of the significance of molecular structure variation that may be realized through the disclosure herein. The exceedingly low pour points that may be realized through the use of Hf metallocene catalyst systems may be highly advantageous for formulating heat transfer fluids suitable for use in cold climates.

Methyl paraffins formed from LAO dimers in accordance with the disclosure herein exhibit Mouromtseff Numbers at 80° C. that are consistent with good heat transfer efficiency under operating conditions at this temperature. Mouromtseff Numbers measured at other temperatures may represent a more accurate measure of the heat transfer efficiency under other operating conditions. The Mouromtseff Number for a fluid at a given temperature is expressed by Equation (1), $$Mo = \frac{\rho^a k^b c_p^d}{\mu^e} \quad (1)$$

wherein Mo is the Mouromtseff Number, $\rho$ is the fluid density, k is the thermal conductivity, $c_p$ is the specific heat, and $\mu$ is the dynamic viscosity of the fluid, and a, b, d and e are empirical values fit to the heat transfer mode of interest. In the case of internal turbulent flow applicable to electric vehicles, the Mouromtseff Number may be expressed by Equation (2), wherein the values of a, b, d and e are empirically determined for the turbulent flow regime.

$$Mo = \frac{\rho^{0.8} k^{0.67} c_p^{0.33}}{\mu^{0.47}} \quad (2)$$

The units for Mouromtseff Number under turbulent flow conditions, taking the exponents in Equation 2 into account, are $W \cdot s^{0.8}/(m^{2.6} \cdot K)$, which may be equivalently expressed as $kg/(s^{2.2} \cdot m^{0.6} \cdot K)$ in full SI units. All Mouromtseff Numbers expressed herein have these units. Relative Mouromtseff Numbers may be calculated by dividing the Mouromtseff Number by the Mouromtseff Number of water.

FIG. 1 shows a plot of flash point versus Mouromtseff Number at 80° C. for various heat transfer fluids. Particularly desirable heat transfer fluids of the present disclosure, containing methyl paraffins having about 12 to about 24 carbon atoms in total or mixtures thereof, may exhibit a Mouromtseff Number at 80° C. that ranges from about 17,000 to about 27,000 $kg/(s_{2.2} \cdot m^{0.6} \cdot K)$. As shown, $C_{16}$ methyl paraffins may exhibit a desirable combination of Mouromtseff Number and flash point.

In addition to their favorable flash points, pour points and Mouromtseff Numbers, which are particularly compatible with the operating temperature range for electric vehicles, methyl paraffins of the present disclosure are substantially electrically insulating. Therefore, the methyl paraffins disclosed herein may be particularly suitable heat transfer fluids for immersion or partial immersion of a battery or other electrical component to promote more effective heat transfer therefrom. Although the heat transfer fluids disclosed herein may be advantageous when used for immersive thermal management applications, it is to be appreciated that the heat transfer fluids may also be used in other manners as well, such as jacketed and/or circulating heat transfer applications, even though such approaches may be less effective for cooling. In addition, the heat transfer fluids disclosed herein may also be suitably used to promote cooling of the electric motor(s) or one or more electric motor components of an electric vehicle, thereby affording simplified operation compared to providing separate cooling systems for the battery and the motor of an electric vehicle. Direct cooling using the heat transfer fluids disclosed herein may also be applicable to electric vehicle fast-charging stations, which may promote battery charging over a span of about 4-5 minutes in non-limiting examples. Other heat-generating components in an electric vehicle, such as frictional heating of the vehicle's axles, for example, may also be addressed through application of the disclosure herein. As such, the present disclosure provides advantageous battery systems, heat transfer fluids, and methods for promoting thermal management in electric vehicles and other applications in which heat generation may be problematic.

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature) is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. Optional heteroatom substitution may be present in a hydrocarbon or hydrocarbyl group.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound.

The term "alkyl" refers to a hydrocarbyl group having no unsaturated carbon-carbon bonds. Optional heteroatom substitution or branching may be present in an alkyl group, unless otherwise specified herein.

The term "alkenyl" refers to a hydrocarbyl group having a carbon-carbon double bond. The terms "alkene" and "olefin" are used synonymously herein. Similarly, the terms "alkenic" and "olefinic" are used synonymously herein. Unless otherwise noted, all possible geometric isomers are encompassed by these terms.

The terms "linear" and "linear hydrocarbon" refer to a hydrocarbon or hydrocarbyl group having a continuous carbon chain without substantial side chain branches.

The term "linear alpha olefin (LAO)" refers to an alkenic hydrocarbon bearing a carbon-carbon double bond at a terminal (end) carbon atom of the main carbon chain. Most often, no side chain branches are present in a LAO, although there may occasionally be a minor amount of branching component in a given LAO sample. Up to one methyl or ethyl branch may be present in LAOs suitable for use in the disclosure herein.

The terms "branch," "branched" and "branched hydrocarbon" refer to a hydrocarbon or hydrocarbyl group having a linear main carbon chain in which a hydrocarbyl side chain extends from the linear main carbon chain. The term "unbranched" refers to a straight-chain hydrocarbon or hydrocarbyl group without side chain groups extending therefrom.

The term "vinylidene" refers to an olefin moiety bearing two hydrogen atoms upon C-1 of the olefin moiety and two hydrocarbyl groups upon C-2 of the olefin moiety.

The term "trisubstituted" refers to an olefin moiety bearing two hydrocarbyl groups upon a first carbon atom of the olefin moiety and one hydrocarbyl group and one hydrogen atom upon a second carbon atom of the olefin moiety, wherein the olefin moiety is non-terminal. According to particular embodiments of the present disclosure, one of the two hydrocarbyl groups upon the first carbon atom of the trisubstituted olefin moiety is a methyl group.

LAOS, which also may be referred to as terminal olefins or terminal alkenes, may be isolated from a petroleum refinery stream. Alternatively, they may be synthesized by several processes starting from low molecular weight feedstock materials, such as via oligomerization of ethylene or through byproduct isolation from the Fischer-Tropsch synthesis. LAOs are composed of a linear hydrocarbon chain, optionally with a minor amount of hydrocarbyl branching (e.g., one methyl or ethyl group per LAO molecule), and have a chemical formula of $C_XH_{2X}$ (x is an integer greater than or equal to 3, particularly an even integer greater than or equal to 4) with a double bond between C-1 and C-2. As such, LAOs represent a versatile and inexpensive feedstock for forming LAO dimers and heat transfer fluids comprising methyl paraffins formed according to the disclosure herein.

Heat transfer fluids of the present disclosure, which may be suitable for use in cooling batteries or other components of electric vehicles, including the electric motor, power electronics or electric motor components of electric vehicles, may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety, in which the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher or about 140° C. or higher. Particularly advantageous heat transfer fluids may be formed from one or more LAO dimers prepared under the influence of a hafnium metallocene catalyst system, particularly an unbridged Hf metallocene catalyst system. Such heat transfer fluids may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety, in which the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, or about 135° C. or higher or about 140° C. or higher, and a pour point of about −42° C. or lower or −45° C. or lower, particularly a pour point ranging from about −42° C. to about −51° C. or about −45° C. to about −51° C. The term "collectively" means "in combination" herein. Thus, a single methyl paraffin, optionally in combination with other methyl paraffins and/or additional components, may exhibit a Mouromtseff Number, thermal conductivity, flash point, and pour point within the foregoing ranges according to the disclosure herein. It is to be appreciated that non-hydrogenated olefin dimers formed according to the disclosure herein may also be suitably used in heat transfer applications in certain instances.

Suitable methyl paraffins may be formed by hydrogenating a homogeneous LAO dimer or a heterogeneous LAO dimer. Homogeneous LAO dimers may be formed by dimerizing (accompanied by a small amount of higher oligomerization, depending on catalyst) a single type of LAO (e.g., a $C_6$, $C_8$, $C_{10}$ or $C_{12}$ LAO dimerized and hydrogenated to a $C_{12}$, $C_{16}$, $C_{20}$ or $C_{24}$ methyl paraffin, respectively). Heterogeneous LAO dimers may be formed by dimerizing two different types of LAOs (e.g., $C_6$ and $C_8$, $C_6$ and $C_{10}$, $C_6$ and $C_{12}$, $C_8$ and $C_{10}$, $C_8$ and $C_{12}$, or $C_{10}$ and $C_{12}$ LAOs dimerized and hydrogenated to a $C_{12}$, $C_{16}$, $C_{18}$, $C_{18}$, $C_{20}$ or $C_{22}$ methyl paraffin, respectively). When two or more LAOs of different types are simultaneously dimerized, a statistical mixture of both homogeneous and heterogeneous LAO dimers of all possible carbon atom counts may be obtained. The actual product distribution that is obtained may depend upon the relative molar amounts of each type of LAO in the LAO mixture that undergoes dimerization. Subsequent hydrogenation may afford the corresponding methyl paraffins in a similar statistical distribution. A single methyl paraffin or subset of methyl paraffins obtained from the LAO mixture may be isolated for use in heat transfer according to the disclosure herein, if desired. Mixtures of methyl paraffins may be employed if the flash point, pour point and/or Mouromtseff number of a single methyl paraffin is insufficient for a particular application.

$C_{12}$-$C_{24}$ methyl paraffins may be synthesized by dimerizing one or more $C_6$-$C_{12}$ LAOs to form a vinylidene moiety and/or a trisubstituted olefin moiety according to the disclosure herein and hydrogenating the resulting dimer containing the vinylidene moiety and/or trisubstituted olefin moiety. It is to be appreciated that other methyl paraffins in the foregoing $C_{12}$-$C_{24}$ range may be prepared by dimerizing olefins having carbon counts above and below the $C_6$-$C_{12}$ range, wherein the resulting methyl group may be positioned at a different location than when dimerizing $C_6$-$C_{12}$ LAOs to form a LAO dimer comprising a vinylidene moiety and/or trisubstituted olefin moiety and then hydrogenating. Concurrent light olefin dimer formation may also occur when forming a $C_{12}$-$C_{24}$ LAO dimer in this manner. Disubstituted vinylene olefins or trisubstituted olefins may be formed when dimerizing LAOs according to the disclosure herein, with these olefins also undergoing hydrogenation to remove the double bond unsaturation in some cases. Hydrogenation of trisubstituted olefins also leads to the formation of methyl paraffins that may become incorporated in the heat transfer fluids disclosed herein. The methyl paraffins obtained through hydrogenation of trisubstituted olefins may be the same as or different than those produced through hydrogenation of LAO dimers comprising a vinylidene moiety. As such, the co-presence of trisubstituted olefins with vinylidene olefins in the one or more LAO dimers may afford further tailoring of the heat transfer properties in the disclosure herein. It is also to be appreciated that there may be variability in the molecular structure(s) obtained when using different metallocene catalyst systems, thereby affording different methyl paraffins with correspondingly different properties following LAO dimer hydrogenation. For example, LAO dimers formed under the influence of an Hf metallocene catalyst system may afford methyl paraffins having lower pour points than those produced with other catalysts, as discussed further herein.

In more particular embodiments, heat transfer fluids of the present disclosure may comprise at least about 90 wt. % methyl paraffins. As discussed herein, $C_{16}$ may be particularly suitable for use in the heat transfer fluids described herein. Thus, at least $C_{16}$ methyl paraffins may be present in the heat transfer fluids in specific embodiments, particularly at least about 75 wt. % $C_{16}$ methyl paraffins in still more specific embodiments, optionally in combination with one or more additional $C_{18}$-$C_{24}$ methyl paraffins to adjust the pour point, flash point, and/or Mouromtseff Number. As such, particular heat transfer fluids may comprise up to about 25 wt. % or up to about 10 wt. % of one or more additional components, such as $C_{18}$, $C_{20}$, $C_{22}$ and/or $C_{24}$ methyl paraffins, or other components suitable for formulating the heat transfer fluids. Other methyl paraffins up to $C_{30}$ may also be present. In other particular embodiments, the heat transfer fluids may comprise at least about 80 wt. % $C_{16}$ methyl paraffins, or at least about 85 wt. % $C_{16}$ methyl paraffins, or at least about 90 wt. % $C_{16}$ methyl paraffins, or at least about 95 wt. % $C_{16}$ methyl paraffins, with other $C_{18}$-$C_{24}$ methyl paraffins and/or other components making up the balance of the heat transfer fluids.

LAO dimers comprising a vinylidene moiety that are suitable for use in the disclosure herein may be synthesized by selective oligomerization of one or more LAOS, particularly $C_6$ to $C_{12}$ LAOS, even more particularly $C_6$, $C_8$, $C_{10}$ and/or $C_{12}$ LAOS. As discussed herein, such LAO dimers may undergo hydrogenation to form methyl paraffins suitable for use in heat transfer fluids of the present disclosure. Minor to significant amounts of vinylene and/or trisubstituted olefin LAO dimers may be formed in some instances, with the amount formed being dependent upon the catalyst choice. Like LAO dimers comprising a vinylidene moiety, LAO dimers comprising a trisubstituted olefin moiety may likewise undergo hydrogenation to form methyl paraffins related to those formed from LAO dimers comprising a vinylidene moiety. The amount of methyl paraffins formed from trisubstituted LAO dimers may impact the heat transfer properties and other physical properties that are ultimately obtained. The heat transfer properties and other physical properties may similarly be impacted by the catalyst that is used to promote dimerization. The LAOs used for forming the LAO dimers of either type may be of the same or different chain lengths, thereby leading to homogeneous or heterogeneous LAO dimers. Higher LAO oligomers, including trimers and tetramers, may also be formed during LAO dimerization. If formed in significant quantities, the higher LAO oligomers may be separated from the LAO dimers prior to hydrogenation when forming the heat transfer fluids disclosed herein.

The reaction to form LAO dimers comprising a vinylidene moiety or a mixture of such LAO dimers in combination with LAO dimers comprising a trisubstituted olefin moiety may be promoted effectively by various metallocene catalyst systems. LAO dimers comprising a vinylidene moiety may be a predominant product when using such catalyst systems, with differing amounts of LAO dimers comprising a trisubstituted olefin moiety being formed depending on the chosen catalyst system. Accordingly, the chosen catalyst system may impact the thermal management properties that are obtained.

According to particular embodiments of the present disclosure, catalyst systems suitable for oligomerizing LAOs into LAO dimers, particularly LAO dimers comprising a vinylidene moiety or a trisubstituted olefin moiety, may comprise a metallocene catalyst system, particularly bridged or unbridged Zr metallocene catalysts, such as bis(cyclopentadienyl)zirconium(IV) dichloride ($Cp_2ZrCl_2$) (Structure 1 below) in combination with a suitable activator.

Structure 1

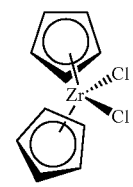

Catalyst systems comprising the foregoing metallocene catalyst may selectively or predominantly produce LAO dimers having a vinylidene moiety extending from the main carbon chain. Greater than 99% vinylidene olefin dimers may be produced in certain instances, with the remaining product constituting trisubstituted LAO dimers. For example, in some instances, suitable catalyst systems may produce up to 99 wt. % vinylidene olefin dimers and 1-2 wt. % trisubstituted LAO dimers.

Alumoxanes, such as methyl alumoxane (MAO), may be suitable activators for the metallocene catalyst of Structure 1 and other metallocene catalysts discussed herein. Catalyst systems comprising a metallocene catalyst may contain a ratio of metallocene:alumoxane (or other activator) ranging from about 1:10,000 to about 10,000:1, or about 1:1,000 to about 1,000:1, or about 1:500 to about 500:1. or about 1:250 to about 250:1, or about 1:100 to about 100:1. The foregoing ratios represent M:Al ratios, wherein Al is the molar amount of aluminum in the alumoxane and M is the molar amount of metal in the metallocene catalyst. In more particular embodiments, the ratio may be an Al:Zr molar ratio ranging from about 1 to about 6 or about 3 to about 12.

Other suitable activators for the metallocene catalyst of Structure 1 and other metallocene catalysts discussed herein may include compounds containing a non-coordinating anion (NCA), especially borane and borate compounds. Particularly useful borane and borate compounds containing a non-coordinating anion or similar entity include, for example, $B(C_6F_5)_3$, $[PhNMe_2H]^+[B(C_6F_5)_4]^-$, $[Ph_3C]^+[B(C_6F_5)_4]^-$, and $[PhNMe_2H]^+[B(C_{10}F_7)_4]^-$.

A non-coordinating anion (NCA) is defined to mean an anion either that does not coordinate to a transition metal center or that does coordinate to a transition metal center, but only weakly. The term NCA is defined to include multicomponent NCA-containing activators, such as N,N-dimethylanilinium tetrakis(pentafluorophenyl)borate and N,N-dimethylanilinium tetrakis(heptafluoronaphthyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Typically, NCAs coordinate weakly enough that a neutral Lewis base, such as an olefin, can displace it from the metal center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

Particularly suitable NCAs may include, for example, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetra(perfluorophenyl) borate, or any combination thereof.

Other Zr metallocene catalysts that may be suitably used for forming the LAO dimers disclosed herein include, for example, bis-(n-propylcyclopentadienyl) zirconium(IV) dichloride (Structure 2), bis(1-butyl-3-methylcyclopentadienyl) zirconium dichloride (Structure 3), Schwartz's reagent (zirconocene chloride hydride, Structure 4), rac-dimethylsilyl-bis-(tetrahydroindenyl) zirconium dimethyl (Structure 5), or rac-ethylenebis(indenyl)zirconium(IV) dichloride (Structure 6). Other hydrocarbyl-substituted metallocenes may also be suitably used herein. As can be appreciated, subtle differences may be realized in the heat transfer and other physical properties of the methyl paraffins obtained when using a particular metallocene catalyst due to the differing ratios of vinylidene olefins to trisubstituted olefins that may be produced during dimerization. Thus, in some instances, a given metallocene catalyst may be used to target a heat transfer fluid having a desired range of physical properties obtainable from a particular ratio of vinylidene olefins to trisubstituted olefins. Heat transfer fluids having a desired range of physical properties may also be produced through differing placement of the methyl group in the methyl paraffins obtained following LAO dimer hydrogenation, with the methyl group placement being dependent upon the particular metallocene catalyst used to form the one or more LAO dimers.

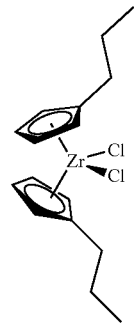

Structure 2

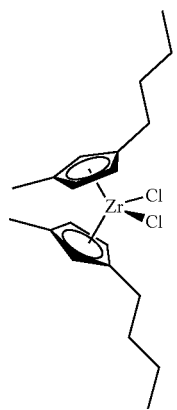

Structure 3

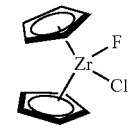

Structure 4

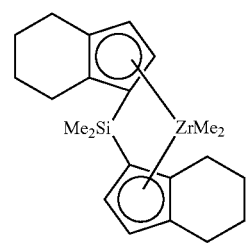

Structure 5

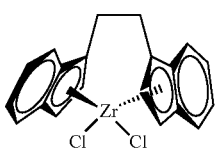

Structure 6

Non-coordinating anion activators, including any of the non-coordinating anion activators disclosed above, may be particularly suitable for use in conjunction with the Zr metallocene catalyst having Structure 5 and similar metallocene catalysts. N,N-dimethylanilinium tetra(perfluorophenyl)borate and N,N-dimethylanilinium tetrakis(perfluoronaphthyl)borate may be particularly suitable non-coordinating anion activators in this regard.

Bridged and unbridged Zr metallocene compounds, such as those presented above, may be effective for providing methyl paraffins having pour points of about −38° C. to about −44° C. or about −39° C. to about −42° C. following hydrogenation of the one or more LAO dimers, particularly one or more $C_{16}$ LAO dimers.

Catalyst systems comprising an unbridged Hf metallocene compound are also effective for forming LAO dimers comprising a vinylidene moiety, which may undergo subsequent hydrogenation to form the corresponding methyl paraffins according to the disclosure herein. Illustrative unbridged Hf metallocene compounds that may be suitable for use in forming one or more LAO dimers comprising a vinylidine moiety include the pentamethylcyclopentadienyl indacenyl compounds represented by Structure 7 below, wherein A is a $C_1$-$C_{20}$ hydrocarbyl group, preferably a branched or unbranched $C_1$-$C_{10}$ alkyl group, or more preferably a branched or unbranched $C_1$-$C_6$ alkyl group.

Structure 7

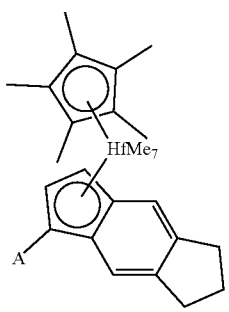

Particular examples of the unbridged Hf metallocene compounds exemplified by Structure 7 include pentamethylcyclopentadienyl(1-methyl-1,5,6,7-tetrahydro-s-indacenyl)hafnium dimethyl (Structure 8) and pentamethylcyclopentadienyl(1-isobutyl-1,5,6,7-tetrahydro-s-indacenyl)hafnium dimethyl (Structure 9).

Structure 8

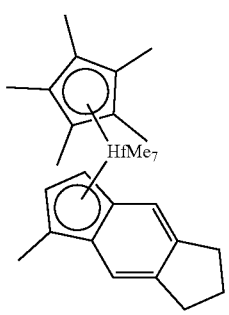

Structure 9

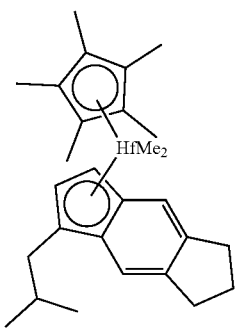

Non-coordinating anion activators, including any of the non-coordinating anion activators disclosed above, may be suitable for use in conjunction with the metallocene catalysts having Structures 7-9 and similar unbridged Hf metallocene catalysts. N,N-dimethylanilinium tetra(perfluorophenyl)borate and N,N-dimethylanilinium tetrakis(perfluoronaphthyl)borate may be particularly suitable non-coordinating anion activators.

Unbridged Hf metallocene compounds, such as those presented above, may be effective for providing methyl paraffins having pour points of about −42° C. or lower or about −45° C. or lower, particularly pour points of about −42° C. to about −51° C., or about −45° C. to about −51° C., or about −48° C. to about −51° C., following hydrogenation of the one or more LAO dimers, particularly one or more $C_{16}$ LAO dimers. These pour points may be significantly different than those afforded using catalyst systems comprising a bridged or unbridged Zr metallocene compound.

Still other suitable bridged metallocene catalysts that may be used for synthesizing LAO dimers comprising a vinylidene moiety and/or a trisubstituted olefin moiety may be found in commonly owned US Patent Publication 2018/0282359, which is incorporated herein by reference in its entirety.

Yet still other catalysts that may be suitably used for reacting LAOs to form the LAO dimers disclosed herein include molecular sieves, particularly medium-pore size zeolites (approximately 4 Å to 7 Å) such as ZSM-23, ZSM-35, ZSM-12, ZSM-48 and similar zeolite catalysts familiar to one having ordinary skill in the art. Particularly suitable ZSM-48 may exhibit a $SiO_2$:$Al_2O_3$ molar ratio ranging from about 20 to about 400, with higher activities being realized at lower molar ratios. In addition, zeolite catalysts such as ZSM-23 and ZSM-48, as well as other zeolite catalysts, may be used to further isomerize the LAO dimers prior to hydrogenation to form the corresponding methyl paraffins. Suitable catalysts do not lead to substantial branching when forming a vinylidene olefin. At most, 1-2 methyl branches per molecule are typically produced.

Reaction 1 below illustrates the general structure for a pair of LAOs and their subsequent dimerization to form a LAO dimer comprising a vinylidene moiety, followed by hydrogenation of the vinylidene moiety into the corresponding methyl paraffin. Given that suitable LAOs for forming heat transfer fluids according to the disclosure herein include those having 6 to 12 carbon atoms, the R groups in Reaction 1 represent an alkyl group having from 4 to 10 carbon atoms, where the alkyl group is most typically unbranched. Optionally branching in the R groups may be present in some instances, wherein the branching is not included in the total carbon count of the LAOs. For example, one methyl or ethyl branch in one or both R groups may be present in some instances. The R groups in each LAO may be of the same length, or they may be of differing lengths. When the R groups are different, a statistical mixture of LAOs having different carbon counts may be produced.

Reaction 1

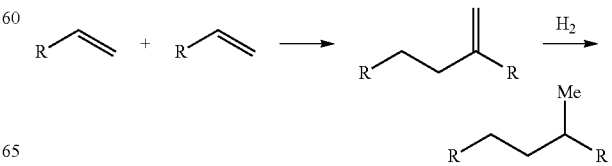

The formation of the related LAO dimers comprising a trisubstituted olefin moiety and the corresponding methyl paraffins is shown in Reaction 2 below, wherein indeterminate olefin geometry in the LAO dimer is indicated by a wavy bond. The R groups in Reaction 2 are defined identically to those shown in Reaction 1, and the chain lengths of the LAOs undergoing dimerization may be the same or different. Again, optional branching may be present in one or both of the R groups.

Reaction 2

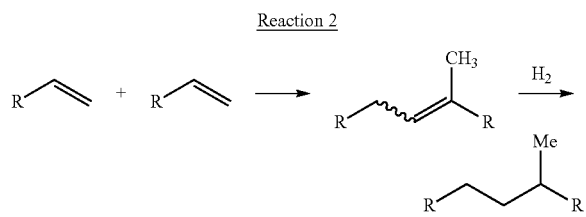

The LAO dimer resulting from Reaction 1 (LAO dimer comprising a vinylidene moiety) may be alternately characterized below as Structure 10, where $R^1$ is an alkyl group having from about 6 to about 12 carbon atoms and $R^2$ is an alkyl group having from about 4 to about 10 carbon atoms. The carbon count range for $R^1$ and $R^2$ differs in this case due to the manner in which the structure is defined (two carbon atoms from one of the LAOs are incorporated in the vinylidene moiety). Under this structural definition, the structure of the corresponding methyl paraffins is shown in Structure 11, wherein $R^1$ and $R^2$ are defined similarly.

Structure 10

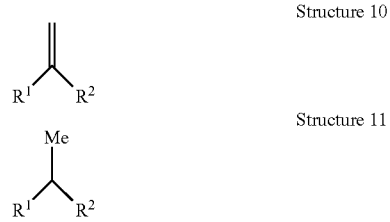

Structure 11

Similarly, the LAO dimer resulting from Reaction 2 (LAO dimer comprising a trisubstituted olefin moiety) may be alternately characterized below as Structure 12, where $R^3$ and $R^4$ are independently alkyl groups having from about 4 to about 10 carbon atoms. $R^3$ and $R^4$ are defined with the same carbon count range in this case due to the manner in which the structure is defined. The structure of the corresponding methyl paraffin is shown in Structure 13, wherein $R^3$ and $R^4$ are defined as above.

Structure 12

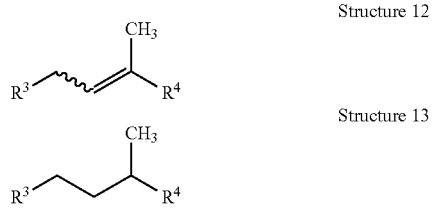

Structure 13

As can be seen, provided that $R^1$ or $R^2$ in Structure 11 has two methylene groups bonded to the methine carbon atom bearing the methyl group, the methyl paraffins defined by Structure 11 and Structure 13 may be structurally similar. Although structurally similar, it is to be appreciated that methyl paraffins produced using different metallocene catalysts may have one or more physical properties differing from one another. As a non-limiting example, dimerization of a LAO using an unbridged Hf metallocene catalyst system may afford methyl paraffins having a lower pour point following hydrogenation than the corresponding methyl paraffins obtained through dimerization with a Zr metallocene catalyst system and subsequent hydrogenation of the resulting LAO dimer.

Hydrogenation of both types of LAO dimers (i.e., vinylidine olefin LAO dimers and trisubstituted olefin LAO dimers) may be carried out in a slurry or fixed bed reactor system using a variety of Ni, Pt or Pd hydrogenation catalysts. Suitable hydrogenation conditions, hydrogenation catalysts, reactors and the like will be familiar to one having ordinary skill in the art.

The heat transfer fluids described herein may be particularly compatible for incorporation in an electric vehicle. Accordingly, electric vehicles disclosed herein may comprise a heat-generating component, and a heat transfer fluid in contact with the heat-generating component. In particular, the heat transfer fluid may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety. The one or more methyl paraffins may contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, and a flash point of about 135° C. or higher or about 140° C. or higher. Particularly advantageous heat transfer fluids may be formed from one or more LAO dimers prepared under the influence of a hafnium metallocene catalyst system, preferably comprising an unbridged Hf metallocene catalyst. Such heat transfer fluids may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety, in which the one or more methyl paraffins contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, a flash point of about 130° C. or higher, or about 135° C. or higher or about 140° C. or higher, and a pour point of about −42° C. or lower or about −45° C. or lower, preferably a pour point ranging from about −42° C. to about −51° C., or about −45° C. to about −51° C., or about −48° C. to about −51° C.

Additional components may be included in any of the heat transfer fluids disclosed herein. Among the additional components that may be present in the heat transfer fluids to address particular application-specific needs include, for example, base oils, aromatic hydrocarbons, polyalphaolefins, paraffins, esters, ethers, gas-to-liquids base oils, Fischer-Tropsch wax-derived base oils, wax-derived hydroisomerized base oils, silicone oils, antioxidants, corrosion inhibitors, antifoam agents, antiwear agents, dispersants, detergents, viscosity modifiers, and any combination thereof. Suitable examples of additional components that may be present are discussed hereinafter.

A wide range of heat transfer fluid base oils is known in the art. Heat transfer fluid base oils that may be useful in the present disclosure include natural oils, mineral oils and synthetic oils, and unconventional oils (or mixtures thereof), any of which can be used unrefined, refined, or re-refined, the latter being also known as reclaimed or reprocessed oil. Unrefined oils include those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one heat transfer fluid base oil property. One skilled in the art will be familiar with many purification processes. Such purification processes may include solvent extraction, secondary distillation, acid extraction, base extraction, filtration, percolation, and any combination thereof. Re-refined oils are obtained by processes analogous to refined oils but using an oil that has been previously used as a feed stock.

Groups I, II, III, IV and V are broad base oil stock categories developed and defined by the American Petroleum Institute (API Publication 1509; www.API.org) to create guidelines for heat transfer fluid base oils. Group I base stocks have a viscosity index of between about 80 to 120 and contain greater than about 0.03% sulfur and/or less than about 90% saturates. Group II base stocks have a viscosity index of between about 80 to 120, and contain less than or equal to about 0.03% sulfur and greater than or equal to about 90% saturates. Group III base stocks have a viscosity index greater than about 120 and contain less than or equal to about 0.03% sulfur and greater than about 90% saturates. Group IV base stocks includes polyalphaolefins (PAOs). Group V base stocks includes base stocks not included in Groups I-IV. Table 1 below summarizes properties of each of these five groups.

TABLE 1

Base Oil Properties

| | Saturates | Sulfur | Viscosity Index |
|---|---|---|---|
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | | polyalphaolefins (PAOs) | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale may also be useful. Natural oils also may vary as to the method used for their production and purification, for example, their distillation range and whether they are straight run or cracked, hydro-refined, or solvent extracted.

Group II and/or Group III hydro-processed or hydrocracked base stocks, including synthetic oils such as alkyl aromatics and synthetic esters are also well known base stock oils that may be used in the disclosure herein.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, or $C_{14}$ olefins or mixtures thereof may be utilized, as described in U.S. Pat. Nos. 4,956,122; 4,827,064; and 4,827,073, each of which is incorporated herein by reference.

Other useful heat transfer fluid oil base stocks include wax isomerate base stocks and base oils, comprising hydroisomerized waxy stocks (e.g., waxy stocks such as gas oils, slack waxes, fuels hydrocracker bottoms, and the like), hydroisomerized Fischer-Tropsch waxes, gas-to-liquids (GTL) base stocks and base oils, and other wax isomerate hydroisomerized base stocks and base oils, or mixtures thereof. Fischer-Tropsch waxes, the high boiling point residues of a Fischer-Tropsch synthesis, are highly paraffinic hydrocarbons with very low sulfur content. The hydroprocessing used for the production of such base stocks may use an amorphous hydrocracking/hydroisomerization catalyst, such as one of the specialized lube hydrocracking (LHDC) catalysts or a crystalline hydrocracking/hydroisomerization catalyst, preferably a zeolitic catalyst.

Gas-to-liquids (GTL) base oils, Fischer-Tropsch wax-derived base oils, and other wax-derived hydroisomerized (wax isomerate) base oils may be advantageously used in the present disclosure, and may have useful kinematic viscosities at 100° C. of about 3 cSt to about 50 cSt, preferably about 3 cSt to about 30 cSt, more preferably about 3.5 cSt to about 25 cSt, as exemplified by GTL 4 with kinematic viscosity of about 4.0 cSt at 100° C. and a viscosity index of about 141. These gas-to-liquids (GTL) base oils, Fischer-Tropsch wax-derived base oils, and other wax-derived hydroisomerized base oils may have useful pour points of about −20° C. or lower, and under some conditions may have advantageous pour points of about −25° C. or lower, with useful pour points of about −30° C. to about −40° C. or lower. Useful compositions of gas-to-liquids (GTL) base oils, Fischer-Tropsch wax-derived base oils, and wax-derived hydroisomerized base oils are recited in U.S. Pat. Nos. 6,080,301; 6,090,989; and 6,165,949, for example, and are incorporated herein in their entirety by reference.

Esters may comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, and the like, with a variety of alcohols such as butyl alcohol, hexyl alcohol, dodecyl alcohol, 2-ethylhexyl alcohol, and the like. Specific examples of these types of esters include dibutyl adipate, di-(2-ethylhexyl) sebacate, di-n-hexyl fumarate, dioctyl sebacate, diisooctyl azelate, diisodecyl azelate, dioctyl phthalate, didecyl phthalate, dieicosyl sebacate, and the like.

Base oils suitable for use in heat transfer fluids useful in the present disclosure may include any of the variety of oils corresponding to API Group I, Group II, Group III, Group IV, and Group V oils, and mixtures thereof, preferably API Group II, Group III, Group IV, and Group V oils, and mixtures thereof, more preferably Group III, Group IV, and Group V base oils, and mixtures thereof Highly paraffinic base oils can be used to advantage in heat transfer fluids useful in the present disclosure. Minor quantities of Group I base stock, such as the amount used to dilute additives for blending into formulated lube oil products, can also be used. Even in regard to the Group II stocks, it is preferred that the Group II stock be in the higher quality range associated with that stock, such as a Group II base stock having a viscosity index in the range 100<VI<120.

The base oil may constitute a major component of the heat transfer fluids of the present disclosure and may be present in an amount ranging from about 50 to about 99 wt. %, preferably from about 70 to about 95 wt. %, and more preferably from about 85 to about 95 wt. %, based on the total weight of the composition. The base oil conveniently has a kinematic viscosity, according to ASTM standards, of about 2.5 cSt to about 12 cSt (or mm$^2$/s) at 100° C. and preferably of about 2.5 cSt to about 9 cSt (or mm$^2$/s) at 100° C. Mixtures of synthetic and natural base oils may be used if desired. Bi-modal mixtures of Group I, II, III, IV, and/or V base stocks may be used, if desired.

Table 2 provides various properties, including KV100, KV40, and flash point for three different samples of various heat transfer fluids. Sample 1 contains a majority c16 methyl paraffin combined with an amount of 150 cSt KV100 metallocene polyalphaolefin to achieve a KV100 of Sample 1 of 2.859 cSt. Sample 2 contains a majority 2 cSt KV100 polyalphaolefin combined with an amount of 150 cSt KV100 metallocene polyalphaolefin to achieve a KV100 of Sample 2 of 2.798 cSt. Sample 3 contains a majority 3 cSt KV100 Group II oil combined with a viscosity index improver to achieve a KV100 of Sample 3 of 2.950 cSt. Accordingly, all three samples have very similar viscosities. All three samples have an EV/Driveline additive package in an amount of 3.5 weight percent added to the samples.

provided by lubrication with these compounds and thus provide an energy efficiency and service life benefit.

The heat transfer fluids useful in the present disclosure may additionally contain one or more commonly used heat transfer fluid performance additives including but not limited to antioxidants, corrosion inhibitors, antifoam agents, and others. These additives are commonly delivered with varying amounts of diluent oil, which may range from 5 wt. % to 50 wt. % of the heat transfer fluid. The additives useful in this disclosure do not have to be soluble in the heat transfer fluids. The types and quantities of performance additives used in the heat transfer fluids of the present disclosure are not limited by the examples shown herein as illustrations.

The heat transfer fluids may include at least one antioxidant. Antioxidants retard the oxidative degradation of fluids during service. Such degradation may result in deposits on metal surfaces, the presence of sludge, or a viscosity increase in the heat transfer fluid. One having ordinary skill in the art will appreciate that a wide variety of oxidation inhibitors may be useful in heat transfer fluids. See, Klamann in Lubricants and Related Products, Verlag Chemie, Deerfield Beach, Fla.; ISBN 0-89573-177-0, and U.S. Pat. Nos. 4,798,684 and 5,084,197, for example.

The heat transfer fluids may include at least one corrosion inhibitor. Corrosion inhibitors are used to reduce the degradation of metallic parts that are in contact with the heat transfer fluids. Corrosion inhibitors are additives that protect metal surfaces against chemical attack by water or other contaminants. A wide variety of corrosion inhibitors are

TABLE 2

| Property | UNIT | Component/Blend# | EV/Driveline Fluid | | |
|---|---|---|---|---|---|
| | | | Sample 1 | Sample 2 | Sample 3 |
| | | C16 methyl paraffin | 75.10% | | |
| | | PAO 2 | | 84.90% | |
| | | mPAO 150 | 21.40% | 11.60% | |
| | | Gr II+ | | | 95.50% |
| | | Viscosity Index Improver (VII) | | | 1.00% |
| | | EV/Driveline additive package | 3.50% | 3.50% | 3.50% |
| | | Total | 100.0% | 100.0% | 100.0% |
| | | Based on Method | | | |
| Kinematic Viscosity @ 100° C. | cSt | ASTM D445 | 2.859 | 2.798 | 2.950 |
| Kinematic Viscosity @ 40° C. | cSt | ASTM D445 | 8.477 | 9.508 | 11.05 |
| Flash point (COC) | ° C. | ASTM D92 | 133 | 169 | 197 |
| Brookfield Viscosity @-40° C. | cP | ASTM D2983 | 320 | 590 | 1,210 |

Figure 2:
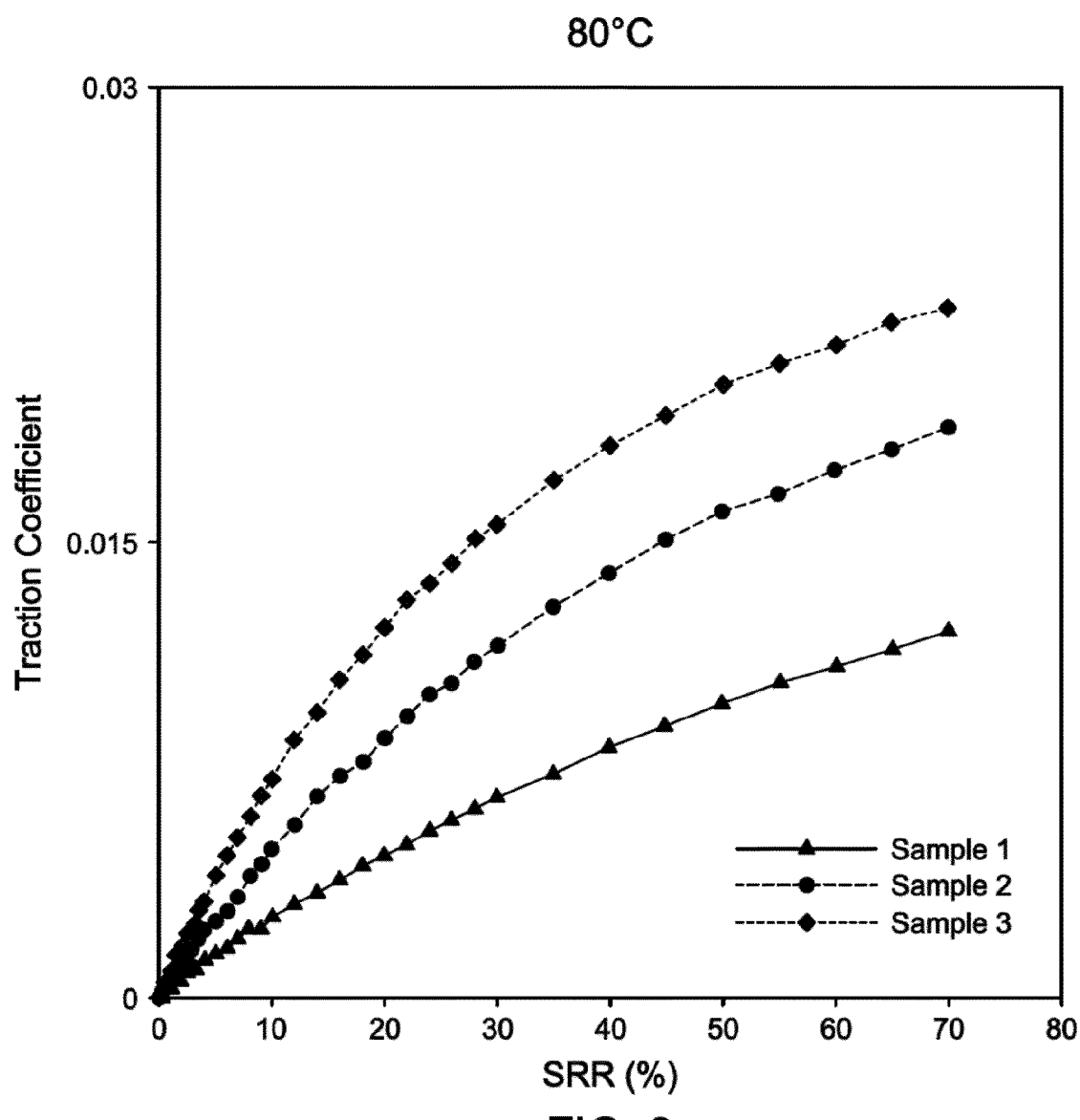
FIG. 2 is a graphical representation of the traction performance at 80° C. of three samples of various heat transfer fluids.
Figure 3:
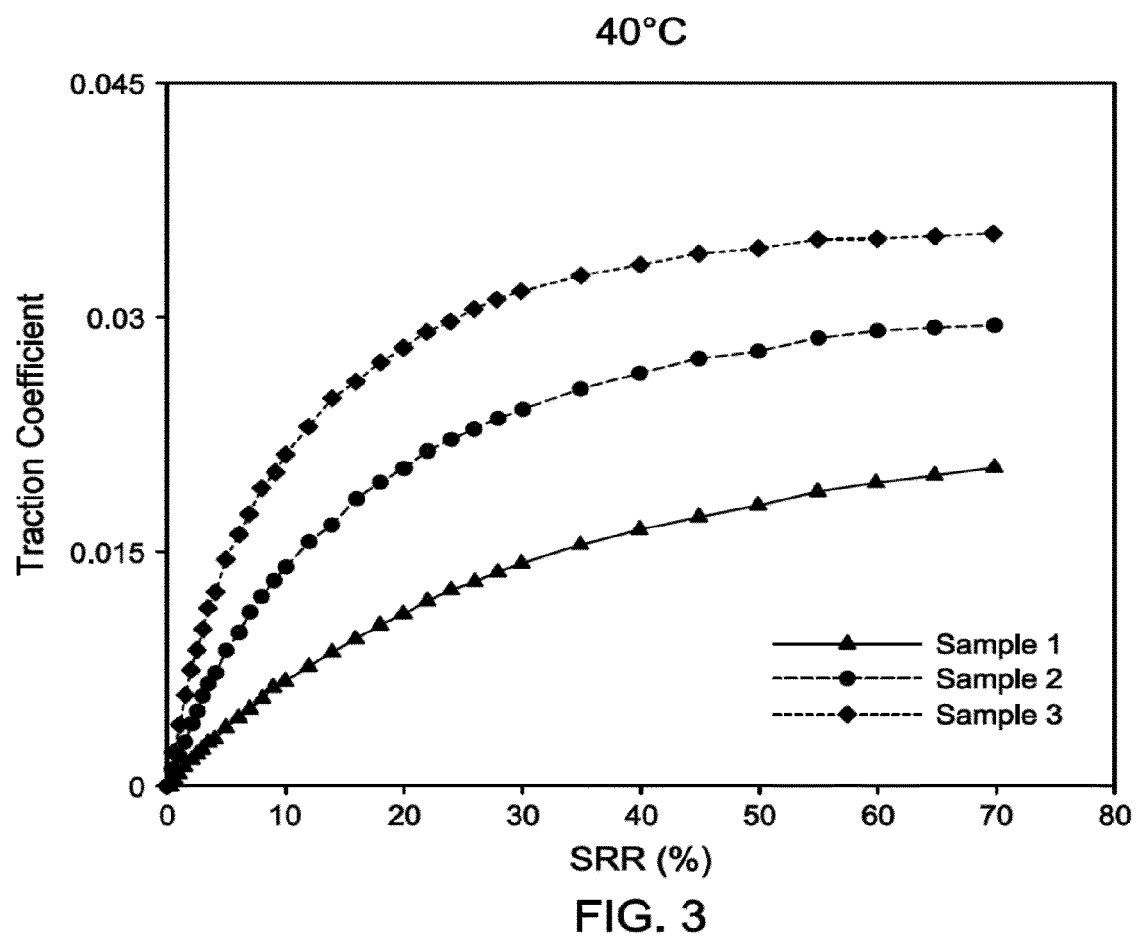
FIG. 3 is a graphical representation of the traction performance at 40° C. of the same three samples of various heat transfer fluids in FIG. 2.

FIG. 2 shows the traction performance at 80° C. of the three samples. The traction coefficient on the y-axis is plotted versus the slide-roll ratio on the x-axis. Traction data was measured at 30 N and speed of 2 m/s at 40 and 80° C. on a mini-traction machine. Sample 1, the blend containing the majority C16 methyl paraffin, shows the lowest traction coefficient, indicating improved energy efficiency in a lubricant application versus the use of the other two samples. Sample 2, the blend containing the majority 2 cSt polyalphaolefin, showed a lower traction coefficient versus Sample 3, the blend with the majority 3 cSt KV100 Group II oil, but Sample 2 had a higher traction coefficient versus Sample 1. FIG. 3 shows the traction performance at 40° C. of the three samples, and is consistent with the performance of the samples at 80° C. Mechanical systems such as gear-boxes, e-modules, transmissions, e-axles, drivelines in EV or driveline applications can benefit from the use of lower traction commercially available. As used herein, corrosion inhibitors include antirust additives and metal deactivators. Suitable corrosion inhibitors also include aryl thiazines, alkyl substituted dimercaptothiodiazoles, alkyl substituted dimercaptothiadiazoles, and mixtures thereof.

One type of suitable corrosion inhibitor is a polar compound that wets the metal surface preferentially, protecting it with a film of oil. Another type of corrosion inhibitor absorbs water by incorporating it in a water-in-oil emulsion so that only the oil touches the metal surface. Yet another type of corrosion inhibitor chemically adheres to the metal to produce a non-reactive surface. Examples of suitable additives include zinc dithiophosphates, metal phenolates, basic metal sulfonates, fatty acids and amines. Such additives may be used in an amount of about 0.01 wt. % to 5 wt. %, preferably about 0.01 to 1.5 wt. %, more preferably 0.01 to 0.2 wt. %, still more preferably 0.01 to 0.1 wt. % (on an as-received basis) based on the total weight of the heat transfer fluid.

Antifoam agents may advantageously be added to heat transfer fluids. These agents retard the formation of stable foams. Silicones and organic polymers are typical antifoam agents. For example, polysiloxanes, such as silicon oil or polydimethylsiloxane, provide antifoam properties. Antifoam agents are commercially available and may be used in conventional minor amounts along with other additives such as demulsifiers; usually the amount of these additives combined is less than 1 wt. % and often less than 0.1 wt. %. In an embodiment, such additives may be used in an amount of about 0.01 to 5 wt. %, preferably 0.1 to 3 wt. %, and more preferably about 0.5 to 1.5 wt. %.

The heat transfer fluids may include at least one antiwear agent. Examples of suitable antiwear agents include oil soluble amine salts of phosphorus compounds, sulphurized olefins, metal dihydrocarbyldithio-phosphates (such as zinc dialkyldithiophosphates), thiocarbamate-containing compounds, such as thiocarbamate esters, thiocarbamate amides, thiocarbamic ethers, alkylene-coupled thiocarbamates, and bis(S-alkyldithiocarbamyl) disulphides.

Antiwear agents used in the heat transfer fluids may be ashless or ash-forming in nature. Preferably, the antiwear agent is ashless. So-called ashless antiwear agents are materials that form substantially no ash upon combustion. For example, non-metal-containing antiwear agents are considered ashless.

The heat transfer fluids of the present disclosure may additionally contain one or more of the other commonly used heat transfer fluid performance additives including but not limited to dispersants, detergents, viscosity modifiers, metal passivators, ionic liquids, extreme pressure additives, anti-seizure agents, wax modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0; see also U.S. Pat. No. 7,704,930, the disclosure of which is incorporated herein by reference in its entirety. These additives are commonly delivered with varying amounts of diluent oil, which may range from 5 wt. % to 50 wt. %.

The heat transfer fluids may include at least one dispersant. During electrical apparatus component operation, oil-insoluble oxidation byproducts are produced. Dispersants help keep these byproducts in solution, thus diminishing their deposition on metal surfaces. Dispersants used in the formulation of the heat transfer fluids may be ashless or ash-forming in nature. Preferably, the dispersant is ashless. So called ashless dispersants are organic materials that form substantially no ash upon combustion. For example, non-metal-containing or borated metal-free dispersants are considered ashless.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

The heat transfer fluids may include at least one detergent. Illustrative detergents useful in this disclosure include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid (e.g., salicylic acid), phosphorous acid, phenol, or mixtures thereof. The counterion is typically an alkaline earth or alkali metal.

Viscosity modifiers (also known as viscosity index improvers (VI improvers), and viscosity improvers) can be included in the heat transfer fluids of this disclosure. Viscosity modifiers provide heat transfer fluids with high and low temperature operability. These additives impart shear stability at elevated temperatures and acceptable viscosity at low temperatures. Suitable viscosity modifiers include high molecular weight hydrocarbons, polyesters and viscosity modifier dispersants that function as both a viscosity modifier and a dispersant. Typical molecular weights of these polymers are about 10,000 to 1,500,000, more typically about 20,000 to 1,200,000, and even more typically between about 50,000 and 1,000,000.

Examples of suitable viscosity modifiers include linear or star-shaped polymers and copolymers of methacrylate, butadiene, olefins, or alkylated styrenes. Polyisobutylene is a commonly used viscosity modifier. Another suitable viscosity modifier is polymethacrylate (copolymers of various chain length alkyl methacrylates, for example), some formulations of which also serve as pour point depressants. Other suitable viscosity modifiers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

The heat transfer fluids may include at least one metal passivator. The metal passivators/deactivators include, for example, benzotriazole, tolyltriazole, 2-mercaptobenzothiazole, dialkyl-2,5-dimercapto-1,3,4-thiadiazole; N,N'-disalicylideneethylenediamine, N,N'-disalicylidenepropylenediamine; zinc dialkyldithiophosphates and dialkyl dithiocarbamates. The metal passivator concentration in the heat transfer fluids of this disclosure can range from about 0.01 to about 5.0 wt. %, preferably about 0.01 to 3.0 wt. %, and more preferably from about 0.01 wt. % to about 1.5 wt. %, based on the total weight of the heat transfer fluid.

Ionic liquids are so-called salt melts, which are preferably liquid at room temperature and/or by definition have a melting point less than 100° C. They have almost no vapor pressure and therefore have no cavitation properties. In addition, through the choice of the cations and anions in the ionic liquids, the lifetime of the heat transfer fluid may be increased, and by adjusting the electric conductivity, these liquids can be used in equipment in which there is an electric charge buildup, such as electric vehicle components. Suitable cations for ionic liquids include a quaternary ammonium cation, a phosphonium cation, an imidazolium cation, a pyridinium cation, a pyrazolium cation, an oxazolium cation, a pyrrolidinium cation, a piperidinium cation, a thiazolium cation, a guanidinium cation, a morpholinium cation, a trialkylsulfonium cation or a triazolium cation.

In electrical apparatus components, static electricity is generated, especially when the heat transfer fluid is in use. To reduce that hazard, a conductive antistatic additive can be added to and distributed throughout the heat transfer fluids. The heat transfer fluid will thereby avoid reduction in its performance associated with local breakdown of the base stock and safety problems from static electric build-up.

A class of products called "antistatic fluids" or "antistatic additives," which also are petroleum distillates, can be added to adjust the conductivity of heat transfer fluids to safe levels, such as at or above 100 pico-siemens per meter conductivity. Very small quantities of these antistatic fluids are required to raise the conductivity to the desired levels, such as 10 to 30 milliliters per 1,000 gallons of hydrocarbon.

Conventional pour point depressants (also known as lube oil flow improvers) may be added to the heat transfer fluids of the present disclosure. Pour point depressants may be added to heat transfer fluids of the present disclosure to lower the minimum temperature at which the fluid will flow or can be poured. Examples of suitable pour point depressants include polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. U.S. Pat. Nos. 1,815,022; 2,015,748; 2,191,498; 2,387,501; 2,655,479; 2,666,746; 2,721,877; 2,721,878; and 3,250,715, each of which is incorporated herein by reference, describe useful pour point depressants and/or the preparation thereof. Such additives may be used in an amount of about 0.01 to 5 wt. %, preferably 0.1 to 3 wt. %, and more preferably about 0.5 to 1.5 wt. %.

The heat transfer fluids can include at least one seal compatibility agent. Seal compatibility agents help to swell elastomeric seals by causing a chemical reaction in the fluid or physical change in the elastomer. Suitable seal compatibility agents for heat transfer fluids include organic phosphates, aromatic esters, aromatic hydrocarbons, esters (butylbenzyl phthalate, for example), and polybutenyl succinic anhydride. Such additives may be used in an amount of about 0.01 to 5 wt. %, preferably 0.1 to 3 wt. %, and more preferably about 0.5 to 1.5 wt. %.

The heat transfer fluids can include at least one friction modifier. A friction modifier is any material or materials that can alter the coefficient of friction of a surface. Friction modifiers, also known as friction reducers, or lubricity agents or oiliness agents, and other such agents that change the ability of base oils, formulated heat transfer fluids, or functional fluids, to modify the coefficient of friction of a surface may be effectively used in combination with the base oils or heat transfer fluids of the present disclosure if desired. Friction modifiers that lower the coefficient of friction are particularly advantageous in combination with the base oils and heat transfer fluids of this disclosure.

Illustrative friction modifiers may include, for example, organometallic compounds or materials, or mixtures thereof. Illustrative organometallic friction modifiers useful in the heat transfer fluids of this disclosure include, for example, molybdenum amine, molybdenum diamine, an organotungstenate, a molybdenum dithiocarbamate, molybdenum dithiophosphates, molybdenum amine complexes, molybdenum carboxylates, the like, and mixtures thereof. Similar tungsten-based compounds may be preferable.

Other illustrative friction modifiers useful in the heat transfer fluids of this disclosure include, for example, alkoxylated fatty acid esters, alkanolamides, polyol fatty acid esters, borated glycerol fatty acid esters, fatty alcohol ethers, and mixtures thereof.

The heat transfer fluids can include at least one extreme pressure agent (EP). EP agents that are soluble in the oil include sulphur- and chlorosulphur-containing EP agents, chlorinated hydrocarbon EP agents and phosphorus EP agents. Examples of such EP agents include chlorinated wax; sulphurised olefins (such as sulphurised isobutylene), organic sulphides and polysulphides such as dibenzyldisulphide, bis-(chlorobenzyl)disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons such as the reaction product of phosphorus sulphide with turpentine or methyl oleate; phosphorus esters such as the dihydrocarbon and trihydrocarbon phosphites, including dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid; amine salts of alkyl and dialkylphosphoric acids or derivatives; and mixtures thereof (as described in U.S. Pat. No. 3,197,405, which is incorporated herein by reference).

Extreme pressure agents may be used in an amount of about 0.01 to 5 wt. %, preferably 0.01 to 1.5 wt. %, more preferably 0.01 to 0.2 wt. %, and still more preferably 0.01 to 0.1 wt. % (on an as-received basis) based on the total weight of the heat transfer fluids.

When heat transfer fluids contain one or more of the additives discussed above, the additive(s) are blended into the heat transfer fluids in an amount sufficient for the heat transfer fluid and the additive to perform an intended function. Typical amounts of such additives useful in the present disclosure are shown in Table 3 below.

It is noted that many of the additives are shipped from the additive manufacturer as a concentrate, containing one or more additives together, with a certain amount of base oil diluent(s). Accordingly, the weight amounts in the Table 3 below, as well as other amounts mentioned herein, are directed to the amount of active ingredient (that is the non-diluent portion of the ingredient). The wt. % values indicated below are based on the total weight of the heat transfer fluids.

TABLE 3

| Compound | Approximate Wt. % (Useful) | Approximate Wt. % (Preferred) |
|---|---|---|
| Antioxidant | 0.01-5 | 0.1-1.5 |
| Corrosion Inhibitor | 0.01-5 | 0.1-2 |
| Antifoam Agent | 0-3 | 0.001-0.15 |
| Metal Passivator | 0.01-5 | 0.01-1.5 |
| Pour Point Depressant | 0.01-5 | 0.5-1.5 |
| Seal Compatibility Agent | 0.01-5 | 0.5-1.5 |
| Extreme Pressure Agent | 0.01-5 | 0.01-0.1 |

The foregoing additives are all commercially available materials. These additives may be added independently but also may be precombined in packages which can be obtained from suppliers of heat transfer fluid additives. Additive packages having a variety of ingredients, proportions and characteristics are available and selection of an appropriate package will take the requisite use of the ultimate heat transfer fluid into account.

Electric vehicles of the present disclosure may comprise any of the heat transfer fluids described further herein. In particular, such electric vehicles may comprise a heat-generating component and a heat transfer fluid in contact with the heat-generating component. As discussed above, the heat transfer fluids may comprise at least about 90 wt. % methyl paraffins in particular embodiments. At least $C_{16}$ methyl paraffins may be present in the heat transfer fluids in more particular embodiments. In still more specific embodiments, the heat transfer fluids may comprise at least about 75 wt. % $C_{16}$ methyl paraffins, or at least about 80 wt. % $C_{16}$ methyl paraffins, or at least about 85 wt. % $C_{16}$ methyl paraffins, or at least about 90 wt. % $C_{16}$ methyl paraffins, or at least about 95 wt. % $C_{16}$ methyl paraffins. Optionally, other methyl paraffins or other suitable components may also be present in the heat transfer fluids, as discussed above.

The heat transfer fluid may be in contact with an outer surface of the heat-generating component in an electric vehicle, including jacketed and immersed configurations. Jacketed configurations include any configuration in which the heat transfer fluid does not contact the cell components of a battery or other heat-generating component directly. Immersed configurations, in contrast, include any configuration in which one or more cell components of a battery or other heat-generating component are directly contacted by the heat transfer fluid. That is, immersed configurations do not necessarily imply that a battery or other heat-generating component is fully submerged in the heat transfer fluid, although it may be. Certain immersed configurations may include those in which a battery cell is enclosed in a suitable container and the heat transfer fluid circulated between the walls of the container and the battery cell. In more specific embodiments, the heat-generating component may be at least partially immersed in the heat transfer fluid. In some embodiments, the heat-generating component may be fully immersed in the heat transfer fluid. The heat transfer fluid may be in an open or closed system when contacting the outer surface of the heat-generating component. A closed system, for example, may be configured to circulate the heat transfer fluid between the heat-generating component and a heat dissipation structure, such as a heat sink, radiator, or similar structure that is capable of removing excess heat from the heat transfer fluid.

In other embodiments, the heat-generating component may comprise a plurality of interior channels configured for circulating the heat transfer fluid. Thus, the heat transfer fluids may also contact additional surfaces of the heat-generating component other than the outer surface. The engineering design of a particular heat-generating component, such as the electric motor or battery of an electric vehicle, may determine whether interior channels may suitably be present. Emerging electric motor designs, such as electric motors directly mounted to each axle, for example, may require a different cooling approach than those incorporated conventionally within the vehicle's body. When interior channels may be suitably present, the heat transfer fluid may be circulated within the interior channels in addition to contacting the outer surface of the heat-generating component in some embodiments. When a heat transfer fluid contacts the outer surface of the heat-generating component and is also circulated within the interior channels of the heat-generating component, two different sources of the heat transfer fluids may be used. For example, in particular embodiments, the heat transfer fluids contacting the outer surface and circulated within the interior channels may be isolated from one another (e.g., by being present in separate reservoirs), such that the heat transfer fluids do not intermingle. Moreover, the heat transfer fluids contacting the outer surface and circulated within the interior channels may be the same or different, according to various embodiments of the present disclosure.

In some or other embodiments, electric vehicles of the present disclosure may further comprise a heat dissipation structure in fluid communication with the heat transfer fluid. In illustrative embodiments, the heat dissipation structure may comprise a conventional heat sink such as a radiator, heat-dissipation fins, or similar air cooling structure. Non-conventional and emerging heat dissipation structures may also be used in various instances. The heat transfer fluid may be configured to circulate between the heat-generating component and the heat dissipation structure in more particular embodiments. Any type of pump may aid in circulating the heat transfer fluid from the heat-generating component to the heat dissipation structure.

In still more particular embodiments, the heat-generating component within the electric vehicles described herein may be a battery, an electric motor, a plurality of electric motors, a power component, a motor component, an axle, or any combination thereof. Power components may include, for example, DC/AC inverters, DC/DC converters, or AC/DC converters, for example. High-power rapid charging stations for electric vehicles may also be cooled using the heat transfer fluids disclosed herein. In some embodiments, the heat transfer fluids described herein may contact at least an outer surface of a battery used in powering the electric vehicle, including immersion or partial immersion of the battery in the heat transfer fluid. The motor or motor components of the electric vehicle may be thermally regulated by a heat transfer fluid of the present disclosure or by conventional heat transfer fluids, such as an aqueous glycol solution. In more particular embodiments, however, both the battery and the motor or motor components of an electric vehicle may be in fluid communication with one or more of the heat transfer fluids described herein. The heat transfer fluid in fluid communication with the battery and the motor or motor components may originate from a common source, or the heat transfer fluids in fluid communication with the battery and with the motor or motor components may originate from different sources. Accordingly, cooling systems suitable for thermally regulating the battery and the electric motor of an electric vehicle may be the same or different in the disclosure herein.

In view of the foregoing, the present disclosure also describes battery systems comprising a heat transfer fluid of the present disclosure in contact with a battery, such as a lithium-ion battery. Battery systems described herein may comprise a battery, and a heat transfer fluid in contact with the battery. In particular, the heat transfer fluid may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety. The one or more methyl paraffins contain about 12 to about 24 carbon atoms, and collectively may have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher or about 140° C. or higher. Particularly advantageous heat transfer fluids may be formed from one or more LAO dimers prepared under the influence of a hafnium metallocene catalyst system, preferably comprising an unbridged Hf metallocene catalyst. Such heat transfer fluids may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety, in which the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, or about 135° C. or higher or about 140° C. or higher, and a pour point of about −42° C.

or lower or about −45° C. or lower, preferably a pour point ranging from about −42° C. to about −51° C., or about −45° C. to about −51° C., or about −48° C. to about −51° C.

Battery systems of the present disclosure may comprise any of the heat transfer fluids described further herein. Heat transfer fluids within the battery systems may comprise at least about 90 wt. % methyl paraffins in particular embodiments. At least $C_{16}$ methyl paraffins may be present in the heat transfer fluids in more particular embodiments. In still more specific embodiments, the heat transfer fluids may comprise at least about 75 wt. % $C_{16}$ methyl paraffins, or at least about 80 wt. % $C_{16}$ methyl paraffins, or at least about 85 wt. % $C_{16}$ methyl paraffins, or at least about 90 wt. % $C_{16}$ methyl paraffins, or at least about 95 wt. % $C_{16}$ methyl paraffins. Optionally, other methyl paraffins or other suitable components may also be present in the heat transfer fluids, as discussed above.

According to particular embodiments of the present disclosure, the heat transfer fluid may be in contact with an outer surface of the battery, including jacketed and immersion configurations. In more specific embodiments, the battery may be at least partially immersed in the heat transfer fluid. In some embodiments, the battery may be fully immersed in the heat transfer fluid, including immersion of the leads of the battery within the heat transfer fluid. The heat transfer fluid contacting an outer surface of the battery may be in an open or closed system. In some or other embodiments, the battery may comprise a plurality of interior channels configured for circulating the heat transfer fluid, such as between the battery and a heat-dissipation structure.

The battery systems disclosed herein may further comprise a heat dissipation structure in fluid communication with the heat transfer fluid, in particular embodiments of the present disclosure. The battery systems may be further configured to circulate the heat transfer fluid between the heat-generating component and a heat dissipation structure in particular embodiments. Suitable heat dissipation structures may include, for example, a heat sink, radiator, or similar structure that is capable of removing excess heat from the heat transfer fluid.

The present disclosure also describes methods for providing thermal regulation of a heat-generating component in some or other embodiments of the present disclosure. Such methods may comprise: providing a heat transfer fluid comprising one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety, in which the one or more methyl paraffins contain about 12 to about 24 carbon atoms, and may collectively have a Mouromtseff Number ranging from about 17,000 to about 27,000 kg/($s^{2.2} \cdot m^{0.6} \cdot K$) at 80° C. and a flash point of about 135° C. or higher or about 140° C. or higher, a thermal conductivity at 80° C. of about 0.165 W/m·K or higher, and operating or placing a heat-generating component in contact with the heat transfer fluid such that a temperature is maintained in a predetermined range. Particularly advantageous heat transfer fluids may be formed from one or more LAO dimers prepared under the influence of a hafnium metallocene catalyst system, preferably comprising an unbridged Hf metallocene catalyst. Such heat transfer fluids may comprise one or more methyl paraffins comprising a hydrogenated reaction product of one or more LAO dimers formed by dimerization of one or more LAOs having about 6 to about 12 carbon atoms and the one or more LAO dimers comprising a vinylidene moiety or a trisubstituted olefin moiety, in which the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, or about 135° C. or higher or about 140° C. or higher, and a pour point of about −42° C. or lower or about −45° C. or lower, preferably a pour point ranging from about −42° C. to about −51° C., or about −45° C. to about −51° C., or about −48° C. to about −51° C. Operation of the heat-generating component may comprise any action that causes the heat-generating component to generate heat. For example, in the case of a battery, charging or discharging the battery may promote excess heat generation, as discussed herein. Thermal management of other heat-generating components such as computer processors within server farms and other high-power electronic components, for example, may also be addressed using the disclosure herein. Rapid charging stations for electric vehicles may also be addressed using the disclosure herein.

The methods may further comprise placing the heat transfer fluid in contact with a surface of the heat-generating component. Particular configurations may include placing the heat transfer fluid in contact with an outer surface of the heat-generating component, including immersion or partial immersion of the heat-generating component in the heat transfer fluid. Jacketed configurations of the heat transfer fluid also reside within the scope of the disclosure herein.

Methods of the present disclosure may further comprise circulating the heat transfer fluid, including, in particular embodiments, circulating the heat transfer fluid between the heat-generating component and a suitable heat dissipation structure.

Embodiments disclosed herein include:
A. Heat transfer fluids. The heat transfer fluids comprise: one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety, the one or more methyl paraffins containing about 12 to about 24 carbon atoms, and collectively having a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.
B. Battery systems. The battery systems comprise: a battery; and a heat transfer fluid in contact with the battery, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety; wherein the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.
C. Electric Vehicles. The electric vehicles comprise: a heat-generating component; and a heat transfer fluid in contact with the heat-generating component, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety; wherein the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher.

D. Methods for transferring excess heat. The methods comprise: providing a heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety; wherein the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, and a flash point of about 135° C. or higher; and operating or placing a heat-generating component in contact with the heat transfer fluid.

Embodiments A-D may have one or more of the following additional elements in any combination:

Element 1: wherein the heat transfer fluid comprises at least about 90 wt. % methyl paraffins.

Element 2: wherein the heat transfer fluid comprises at least $C_{16}$ methyl paraffins.

Element 3: wherein the heat transfer fluid comprises at least about 75 wt. % $C_{16}$ methyl paraffins.

Element 4: wherein the one or more methyl paraffins have a pour point as low as −44° C.

Element 5: wherein the heat transfer fluid further comprises at least one fluid selected from the group consisting of a Group I base oil, a Group II base oil, a Group III base oil, a Group IV base oil, a Group V base oil, and any combination thereof.

Element 6: wherein the heat transfer fluid further comprises at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.

Element 7: wherein the heat transfer fluid further comprises one or more additives selected from the group consisting of an antioxidant, a corrosion inhibitor, an antifoam agent, an antiwear additive, a dispersant, a detergent, a viscosity modifier, and any combination thereof.

Element 8: wherein the heat transfer fluid is in contact with an outer surface of the battery.

Element 9: wherein the battery is at least partially immersed in the heat transfer fluid.

Element 10: wherein the battery comprises a plurality of interior channels configured for circulating the heat transfer fluid.

Element 11: wherein the battery system further comprises a heat dissipation structure in fluid communication with the heat transfer fluid.

Element 12: wherein the battery system is configured to circulate the heat transfer fluid between the battery and the heat dissipation structure.

Element 13: wherein the battery is a lithium-ion battery.

Element 14: wherein the heat transfer fluid is in contact with an outer surface of the heat-generating component.

Element 15: wherein the heat-generating component is at least partially immersed in the heat transfer fluid.

Element 16: wherein the heat-generating component comprises a plurality of interior channels configured for circulating the heat transfer fluid.

Element 17: wherein the electric vehicle further comprises a heat dissipation structure in fluid communication with the heat transfer fluid.

Element 18: wherein the heat-generating component is a battery, a power component, a motor, a motor component, or any combination thereof.

Element 19: wherein the method further comprises circulating the heat transfer fluid between the heat-generating component and a heat dissipation structure.

Element 20: wherein the battery, the power component, the motor, or the motor component is present in an electric vehicle.

Element 21: wherein the one or more LAOs have about 8 to about 12 carbon atoms, and the one or more LAO dimers contain about 16 to about 24 carbon atoms.

By way of non-limiting example, exemplary combinations applicable to A-D include 1 and 2; 1 and 3; 1 and 4; 1 and 5; 1 and 6; 1 and 7; 1 and 4-7; 1 and 5-7; 1 and 21; 2 and 3; 2 and 4; 2 and 4-7; 2 and 5-7; 2 and 5; 2 and 6; 2 and 7; 2-4; 2 and 21; 3 and 4; 3 and 5; 3 and 6; 3 and 7; 3 and 4-7; 3 and 5-7; 3 and 21; 4-7; 4 and 5; 4 and 6; 4 and 7; 4 and 21; 5-7 and 21; and 5-7. For B-D any of the foregoing may be in further combination with one or more of 8-20. Further exemplary combinations applicable to B include 8 and 9; 8, 9 and 11; 8 and 11; 8, 11 and 12; 8 and 13; 8 and 21; 9 and 11; 9 and 12; 9 and 13; 9 and 21; 10 and 11; 10 and 12; 10 and 21; and 10 and 13. Any of the foregoing may be in further combination with one or more of 1-7. Further exemplary combinations applicable to C include 14 and 15; 14, 15 and 17; 14 and 17; 14 and 18; 14, 15 and 18; 14 and 21; 15 and 17; 15 and 18; 15 and 21; 16 and 17; 16 and 21; and 16 and 18. Any of the foregoing may be in further combination with one or more of 1-7. Further exemplary combinations applicable to D include 14 and 15; 14, 15 and 19; 14 and 19; 14 and 21; 15 and 19; 15 and 21; 16 and 19; 16 and 21; 14 and 20; 15 and 20; 16 and 20; and 16 and 21. Any of the foregoing may be in further combination with one or more of 1-7.

Further embodiments disclosed herein include:

A1. Heat transfer fluids. The heat transfer fluids comprise: one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety, the one or more methyl paraffins containing about 12 to about 24 carbon atoms, and collectively having a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower.

B1. Battery systems. The battery systems comprise: a battery; and a heat transfer fluid in contact with the battery, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety; wherein the one or more methyl paraffins contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, a flash point of about 130° C. or higher, and a pour point of about −42° C. or lower.

C1. Electric Vehicles. The electric vehicles comprise: a heat-generating component; and a heat transfer fluid in contact with the heat-generating component, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety; wherein the one or more methyl paraffins contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, a flash point of about 130° C. or higher, and a pour point of −42° C. or lower.

D1. Methods for transferring excess heat. The methods comprise: providing a heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety; wherein the one or more methyl paraffins contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, a flash point of about 130° C. or higher, and a pour point of about −42° C. or lower; and operating or placing a heat-generating component in contact with the heat transfer fluid.

Embodiments A1-D1 may have one or more of the following additional elements in any combination:

Element 1': wherein the heat transfer fluid comprises at least about 90 wt. % methyl paraffins.

Element 2': wherein the heat transfer fluid comprises at least $C_{16}$ methyl paraffins.

Element 3': wherein the heat transfer fluid comprises at least about 75 wt. % $C_{16}$ methyl paraffins.

Element 4': wherein the one or more methyl paraffins have a pour point as low as about −51° C.

Element 5': wherein the heat transfer fluid further comprises at least one fluid selected from the group consisting of a Group I base oil, a Group II base oil, a Group III base oil, a Group IV base oil, a Group V base oil, and any combination thereof.

Element 6': wherein the heat transfer fluid further comprises at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.

Element 7': wherein the heat transfer fluid further comprises one or more additives selected from the group consisting of an antioxidant, a corrosion inhibitor, an antifoam agent, an antiwear additive, a dispersant, a detergent, a viscosity modifier, and any combination thereof.

Element 8': wherein the heat transfer fluid is in contact with an outer surface of the battery.

Element 9': wherein the battery is at least partially immersed in the heat transfer fluid.

Element 10': wherein the battery comprises a plurality of interior channels configured for circulating the heat transfer fluid.

Element 11': wherein the battery system further comprises a heat dissipation structure in fluid communication with the heat transfer fluid.

Element 12': wherein the battery system is configured to circulate the heat transfer fluid between the battery and the heat dissipation structure.

Element 13': wherein the battery is a lithium-ion battery.

Element 14': wherein the heat transfer fluid is in contact with an outer surface of the heat-generating component.

Element 15': wherein the heat-generating component is at least partially immersed in the heat transfer fluid.

Element 16': wherein the heat-generating component comprises a plurality of interior channels configured for circulating the heat transfer fluid.

Element 17': wherein the electric vehicle further comprises a heat dissipation structure in fluid communication with the heat transfer fluid.

Element 18': wherein the heat-generating component is a battery, a power component, a motor, a motor component, or any combination thereof.

Element 19': wherein the method further comprises circulating the heat transfer fluid between the heat-generating component and a heat dissipation structure.

Element 20': wherein the battery, the power component, the motor, or the motor component is present in an electric vehicle.

Element 21': wherein the one or more LAOs have about 8 to about 12 carbon atoms, and the one or more LAO dimers contain about 16 to about 24 carbon atoms.

Element 22': wherein the one or more LAO dimers are formed in the presence of an unbridged Hf metallocene catalyst system.

Element 23': wherein the one or more methyl paraffins have a pour point of about −45° C. or lower.

Element 24': wherein the one or more methyl paraffins have a pour point of about −48° C. or lower.

Element 25': wherein the one or more methyl paraffins have a pour point ranging from about −42° C. to about −51° C. or about −45° C. to about −51° C.

By way of non-limiting example, exemplary combinations applicable to A1-D1 include 1' and 2'; 1' and 3'; 1' and 4'; 1' and 5'; 1' and 6'; 1' and 7'; 1' and 4'-7'; 1' and 5'-7'; 1' and 21'; 1' and 22'; 1' and 23', 24' or 25'; 2' and 3'; 2' and 4'; 2' and 4'-7'; 2' and 5'-7'; 2' and 5'; 2' and 6'; 2' and 7'; 2'-4'; 2' and 21'; 2' and 22'; 2' and 23', 24' or 25'; 3' and 4'; 3' and 5'; 3' and 6'; 3' and 7'; 3' and 4'-7'; 3' and 5'-7'; 3' and 21'; 3' and 22'; 3' and 23', 24' or 25'; 4'-7'; 4' and 5'; 4' and 6'; 4' and 7'; 4' and 21'; 4' and 22'; 4' and 23', 24' or 25'; 5'-7' and 21'; 5'-7' and 22'; 5'- 7'; 5'-7' and 23', 24' or 25'; 21' and 22'; 21' and 23', 24' or 25'; and 22' and 23', 24' or 25'. For B1-D1 any of the foregoing may be in further combination with one or more of 8'-20'. Further exemplary combinations applicable to B1 include 8' and 9'; 8', 9' and 11'; 8' and 11'; 8', 11' and 12'; 8' and 13'; 8' and 21'; 8' and 22'; 8' and 23', 24' or 25'; 9' and 11'; 9' and 12'; 9' and 13'; 9' and 21'; 9' and 22; 9' and 23', 24' or 25'; 10' and 11'; 10' and 12'; 10 and 21'; 10' and 22'; 10' and 13'; and 10' and 23', 24' or 25'. Any of the foregoing may be in further combination with one or more of 1'-7'. Further exemplary combinations applicable to C1 include 14' and 15'; 14', 15' and 17'; 14' and 17'; 14' and 18'; 14', 15' and 18'; 14' and 21'; 14' and 22'; 14 and 23', 24' or 25'; 15' and 17'; 15' and 18'; 15' and 21'; 15' and 22'; 15' and 23', 24' or 25'; 16' and 17'; 16' and 21'; 16' and 22'; 16' and 18'; and 16' and 23', 24' or 25'. Any of the foregoing may be in further combination with one or more of 1'-7'. Further exemplary combinations applicable to D1 include 14' and 15'; 14', 15' and 19'; 14' and 19'; 14' and 21'; 14' and 22'; 14' and 23', 24' or 25'; 15' and 19'; 15' and 21'; 15' and 22'; 15' and 23', 24' or 25'; 16' and 19'; 16' and 21'; 16' and 22'; 16' and 23', 24' or 25'; 14' and 20'; 15' and 20'; 16' and 20'; 16' and 21'; 16' and 22'; and 16' and 23', 24' or 25'. Any of the foregoing may be in further combination with one or more of 1'-7'.

This invention further relates to:

1. A heat transfer fluid comprising:
   one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety, the one or more methyl paraffins containing about 12 to about 24 carbon atoms, and collectively having a Mouromtseff Number ranging from about 17,000 to about 27,000 $kg/(s^{2.2} \cdot m^{0.6} \cdot K)$ at 80° C., a thermal conductivity at 80° C. of about 0.165 W/m·K or higher, a flash point of about 130° C. or higher, and a pour point of about −42° C. or lower.
2. The heat transfer fluid of paragraph 1, wherein the heat transfer fluid comprises at least about 90 wt. % methyl paraffins.
3. The heat transfer fluid of paragraph 1, wherein the heat transfer fluid comprises at least $C_{16}$ methyl paraffins.
4. The heat transfer fluid of paragraph 1, wherein the heat transfer fluid comprises at least about 75 wt. % $C_{16}$ methyl paraffins.
5. The heat transfer fluid of paragraph 1, wherein the one or more methyl paraffins have a pour point ranging from about −48° C. to about −51° C.
6. The heat transfer fluid of paragraph 1, further comprising:
   at least one fluid selected from the group consisting of a Group I base oil, a Group II base oil, a Group III base oil, a Group IV base oil, a Group V base oil, and any combination thereof.
7. The heat transfer fluid of paragraph 1, further comprising:
   at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.
8. The heat transfer fluid of paragraph 1, further comprising:
   one or more additives selected from the group consisting of an antioxidant, a corrosion inhibitor, an antifoam agent, an antiwear additive, a dispersant, a detergent, a viscosity modifier, and any combination thereof.
9. The heat transfer fluid of paragraph 1, wherein the one or more LAOs have about 8 to about 12 carbon atoms, and the one or more LAO dimers contain about 16 to about 24 carbon atoms.
10. The heat transfer fluid of paragraph 1, wherein the one or more LAO dimers are formed in the presence of an unbridged Hf metallocene catalyst system.
11. The heat transfer fluid of paragraph 10, wherein the one or more methyl paraffins have a pour point of about −45° C. or lower.
12. A battery system comprising:
    a battery; and
    a heat transfer fluid in contact with the battery, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety;
    wherein the one or more methyl paraffins contain about 12 to about 24 carbon atoms, and collectively have a Mouromtseff Number ranging from about 17,000 to about 27,000 $kg/(s^{2.2} \cdot m^{0.6} \cdot K)$ at 80° C., a thermal conductivity at 80° C. of about 0.165 W/m·K or higher, a flash point of about 130° C. or higher, and a pour point of about −42° C. or lower.
13. The battery system of paragraph 12, wherein the heat transfer fluid is in contact with an outer surface of the battery.
14. The battery system of paragraph 12, wherein the battery is at least partially immersed in the heat transfer fluid.
15. The battery system of paragraph 12, wherein the battery comprises a plurality of interior channels configured for circulating the heat transfer fluid.
16. The battery system of paragraph 12, further comprising:
    a heat dissipation structure in fluid communication with the heat transfer fluid.
17. The battery system of paragraph 16, wherein the battery system is configured to circulate the heat transfer fluid between the battery and the heat dissipation structure.
18. The battery system of paragraph 12, wherein the battery is a lithium-ion battery.
19. The battery system of paragraph 12, wherein the heat transfer fluid comprises at least about 90 wt. % methyl paraffins.
20. The battery system of paragraph 12, wherein the heat transfer fluid comprises at least $C_{16}$ methyl paraffins.
21. The battery system of paragraph 12, wherein the heat transfer fluid comprises at least about 75 wt. % $C_{16}$ methyl paraffins.
22. The battery system of paragraph 12, wherein the one or more methyl paraffins have a pour point ranging from about −48° C. to about −51° C.
23. The battery system of paragraph 12, wherein the heat transfer fluid further comprises at least one fluid selected from the group consisting of a Group I base oil, a Group II base oil, a Group III base oil, a Group IV base oil, a Group V base oil, and any combination thereof.

24. The battery system of paragraph 12, wherein the heat transfer fluid further comprises at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.

25. The battery system of paragraph 12, wherein the heat transfer fluid further comprises one or more additives selected from the group consisting of an antioxidant, a corrosion inhibitor, an antifoam agent, an antiwear additive, a dispersant, a detergent, a viscosity modifier, and any combination thereof.

26. The battery system of paragraph 12, wherein the one or more LAOs have about 8 to about 12 carbon atoms, and the one or more LAO dimers contain about 16 to about 24 carbon atoms.

27. The battery system of paragraph 12, wherein the one or more LAO dimers are formed in the presence of an unbridged Hf metallocene catalyst system.

28. The battery system of paragraph 27, wherein the one or more methyl paraffins have a pour point of about −45° C. or lower.

29. An electric vehicle comprising:
a heat-generating component; and
a heat transfer fluid in contact with the heat-generating component, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety;
wherein the one or more methyl paraffins contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, a flash point of about 130° C. or higher, and a pour point of −42° C. or lower.

30. The electric vehicle of paragraph 29, wherein the heat transfer fluid is in contact with an outer surface of the heat-generating component.

31. The electric vehicle of paragraph 29, wherein the heat-generating component is at least partially immersed in the heat transfer fluid.

32. The electric vehicle of paragraph 29, wherein the heat-generating component comprises a plurality of interior channels configured for circulating the heat transfer fluid.

33. The electric vehicle of paragraph 29, further comprising:
a heat dissipation structure in fluid communication with the heat transfer fluid.

34. The electric vehicle of paragraph 33, wherein the heat transfer fluid is configured to circulate between the heat-generating component and the heat dissipation structure.

35. The electric vehicle of paragraph 29, wherein the heat-generating component is a battery, a power component, a motor, a motor component, or any combination thereof.

36. The electric vehicle of paragraph 29, wherein the heat transfer fluid comprises at least about 90 wt. % methyl paraffins.

37. The electric vehicle of paragraph 29, wherein the heat transfer fluid comprises at least $C_{16}$ methyl paraffins.

38. The electric vehicle of paragraph 29, wherein the heat transfer fluid comprises at least about 75 wt. % $C_{16}$ methyl paraffins.

39. The electric vehicle of paragraph 29, wherein the one or more methyl paraffins have a pour point ranging from about −48° C. to about −51° C.

40. The electric vehicle of paragraph 29, wherein the heat transfer fluid further comprises at least one fluid selected from the group consisting of a Group I base oil, a Group II base oil, a Group III base oil, a Group IV base oil, a Group V base oil, and any combination thereof.

41. The electric vehicle of paragraph 29, wherein the heat transfer fluid further comprises at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.

42. The electric vehicle of paragraph 29, wherein the heat transfer fluid further comprises one or more additives selected from the group consisting of an antioxidant, a corrosion inhibitor, an antifoam agent, an antiwear additive, a dispersant, a detergent, a viscosity modifier, and any combination thereof.

43. The electric vehicle of paragraph 29, wherein the one or more LAOs have about 8 to about 12 carbon atoms, and the one or more LAO dimers contain about 16 to about 24 carbon atoms.

44. The electric vehicle of paragraph 29, wherein the one or more LAO dimers are formed in the presence of an unbridged Hf metallocene catalyst system.

45. The electric vehicle of paragraph 44, wherein the one or more methyl paraffins have a pour point of about −45° C. or lower.

46. A method comprising:
providing a heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety;
wherein the one or more methyl paraffins contain about 12 to about 24 carbon atoms, and collectively have a Mouromtseff Number ranging from about 17,000 to about 27,000 kg/(s$^{2.2}$·m$^{0.6}$·K) at 80° C., a thermal conductivity at 80° C. of about 0.165 W/m·K or higher, a flash point of about 130° C. or higher, and a pour point of about −46° C. or lower; and
operating or placing a heat-generating component in contact with the heat transfer fluid.

47. The method of paragraph 46, wherein the heat transfer fluid is in contact with an outer surface of the heat-generating component.

48. The method of paragraph 46, wherein the heat-generating component is at least partially immersed in the heat transfer fluid.

49. The method of paragraph 46, further comprising:
circulating the heat transfer fluid between the heat-generating component and a heat dissipation structure.

50. The method of paragraph 46, wherein the heat-generating component is a battery, a power component, a motor, a motor component, or any combination thereof.
51. The method of paragraph 50, wherein the battery, the power component, the motor, or the motor component is present in an electric vehicle.
52. The method of paragraph 50, wherein the battery is a lithium-ion battery.
53. The method of paragraph 46, wherein the heat transfer fluid comprises at least about 90 wt. % methyl paraffins.
54. The method of paragraph 46, wherein the heat transfer fluid comprises at least $C_{16}$ methyl paraffins.
55. The method of paragraph 46, wherein the heat transfer fluid comprises at least about 75 wt. % $C_{16}$ methyl paraffins.
56. The method of paragraph 46, wherein the one or more methyl paraffins have a pour point ranging from about −48° C. to about −51° C.
57. The method of paragraph 46, wherein the heat transfer fluid further comprises at least one fluid selected from the group consisting of a Group I base oil, a Group II base oil, a Group III base oil, a Group IV base oil, a Group V base oil, and any combination thereof.
58. The method of paragraph 46, wherein the heat transfer fluid further comprises at least one fluid selected from the group consisting of an aromatic hydrocarbon, a polyalphaolefin, a paraffin, an isoparaffin, ester, an ether, a Gas-to-Liquids (GTL) base oil, a Fischer-Tropsch wax-derived base oil, a wax-derived hydroisomerized base oil, a silicone oil, and any combination thereof.
59. The method of paragraph 46, wherein the heat transfer fluid further comprises one or more additives selected from the group consisting of an antioxidant, a corrosion inhibitor, an antifoam agent, an antiwear additive, a dispersant, a detergent, a viscosity modifier, and any combination thereof.
60. The method of paragraph 46, wherein the one or more LAOs have about 8 to about 12 carbon atoms, and the one or more LAO dimers contain about 16 to about 24 carbon atoms.
61. The method of paragraph 46, wherein the one or more LAO dimers are formed in the presence of an unbridged Hf metallocene catalyst system.
62. The method of paragraph 61, wherein the one or more methyl paraffins have a pour point of about −45° C. or lower.
63. The heat transfer fluid of paragraph 1, wherein the fluid has a traction coefficient of less than 0.012 at slide-roll ratio of 50% when measured at 30 N and speed of 2 m/s at 80° C. on a mini-traction machine.
64. The battery system of paragraph 12, further comprising a mechanical system in fluid communication with the heat transfer fluid wherein the heat transfer fluid provides lubrication to mechanical system.
65. The electric vehicle of paragraph 29, further comprising a mechanical system in fluid communication with the heat transfer fluid wherein the heat transfer fluid provides lubrication to mechanical system.
66. The method of paragraph 46, further comprising operating or placing a mechanical system component in contact with the heat transfer fluid to provide lubrication to mechanical system.

To facilitate a better understanding of the embodiments described herein, the following examples of various representative embodiments are given. In no way should the following examples be read to limit, or to define, the scope of the present disclosure.

EXAMPLES

Example 1: $C_{16}$ Methyl Paraffins Formed with $Cp_2ZrCl_2$. A commercial feed comprising ~93% $C_8$ LAOs was treated with AZ-300 adsorbent, a homogeneous combination of activated alumina and molecular sieve adsorbents, to remove oxygenates, moisture and other contaminants. The LAOs were then oligomerized under homogeneous conditions in the presence of a catalyst system comprising bis (cyclopentadienyl)zirconium(IV) dichloride catalyst ($Cp_2ZrCl_2$) and methylalumoxane (MAO) as a catalytic activator. Oligomerization was conducted using a continuous polymerization unit with a continuous stirred-tank reactor (CSTR). The catalyst system was prepared by mixing powdered $Cp_2ZrCl_2$ with purified, dewatered toluene. MAO, supplied in a toluene solution, was further diluted and kept in a separate container. Both components of the catalyst system were then fed from separate vessels into the reactor subsurface via a dip tube and were subsequently mixed with the LAOs therein. Process conditions and results are specified in Table 4 below. Trisubstituted olefin dimers were not separated prior to hydrogenation.

TABLE 4

| Process conditions and results for Example 1 | |
|---|---|
| Molar ratio of Al:Zr | ~3 |
| Molar ratio of LAO:Zr | ~700 |
| Zr concentration (ppm) | ~500-600 |
| Residence time (hrs) | ~6 |
| Temperature (° C.) | ~70 |
| Dimer selectivity (%) | >98 |
| Conversion (%) | ~65 |

Upon completion of the reaction, the effluent was quenched with water, filtered through diatomaceous earth to remove the catalyst system, and distilled. Vinylidene olefin dimers were obtained as the principal reaction product, along with some trisubstituted olefin dimers. The distilled product contained ~99% vinylidene LAO dimers and ~1% trisubstituted LAO dimers, each having 16 total carbon atoms.

The product was further hydrogenated using slurry hydrogenation in the presence of D-49 Ni/Ni monoxide powder catalyst supported on silicon dioxide. The hydrogenation reaction was carried out at approximately 230° C. and approximately 650 psi for about 1 hour. The catalyst charge was approximately 0.5 wt. %. The resulting product exceeded 99 wt. % $C_{16}$ methyl paraffins having the characteristics specified in Table 5 below.

TABLE 5

| Methyl paraffin characterization for Example 1 | |
|---|---|
| Kinematic Viscosity (40° C., ASTM D445) | 2.789 CSt |
| Kinematic Viscosity (100° C., ASTM D445) | 1.177 CSt |
| Viscosity Index (ASTM D2270) | 222 |
| Pour Point (ASTM D5059) | −42° C. |
| Flash Point (ASTMD92-Cleveland open cup) | 135° C. |
| Density (15.6° C.) | 0.78 g/cm³ |
| Density (80° C.) | 0.7335 g/cm³ |

TABLE 5-continued

Methyl paraffin characterization for Example 1

| | |
|---|---|
| Thermal Conductivity (80° C.) | 0.168 W/m · K |
| Specific Heat (60° C.) | 2.327 kJ/kg · K |
| Specific Heat (80° C.) | 2.388 kJ/kg · K |
| Prandtl Number (80° C.) | 15 |
| Mouremtseff Number (80° C.) | 19,153 kg/(s$^{2.2}$ · m$^{0.6}$ · K) |
| Electrical Conductivity (25° C.) | 0 pS/m |
| Volume Resistivity (25° C.) | 4.3 × 10$^{15}$ GΩ · m |
| Volume Resistivity (80° C.) | 2.7 × 10$^{14}$ GΩ · m |
| Dielectric Constant (1 kHz, 25° C.) | 2.040 |
| Dielectric Constant (1 kHz, 80° C.) | 1.985 |
| Total Water | <25 ppm |

Elemental analysis of the product by ICP is shown below in Table 6, which shows that highly pure methyl paraffin products were obtained. Notably, potential corrosion-causing ions were absent.

TABLE 6

| | |
|---|---|
| Total sulfur | <0.1 ppm |
| Cl | <50 ppm |
| Na | <3 ppm |
| B | <4 ppm |
| Al | <0.2 ppm |
| Ca | <3.5 ppm |
| Co | <0.2 ppm |
| Cr | <0.2 ppm |
| Cu | ~0.3 ppm |
| Li | <0.2 ppm |
| Ni | <0.2 ppm |
| Si | <10 ppm |
| Ti | <0.2 ppm |
| P | <3 ppm |

Example 2: $C_{16}$ Methyl Paraffins Formed with rac-Dimethylsilylbis(tetrahydroindenyl)zirconium Dimethyl. This example was carried out in a similar manner to that specified in Example 1, except rac-dimethylsilylbis(tetrahydroindenyl)zirconium dimethyl was used as the catalyst and N,N-dimethylanilinium tetrakis(pentafluorophenyl)borate was used as the activator. Additional process differences included an oligomerization temperature of ~135° C., a residence time of ~2 hours, and an LAO conversion percentage of ~92-94%. After distillation, the product contained ~40 wt. % dimers, ~27.5 wt. % trimers, ~12.5 wt. % tetramers, and ~20 wt. % pentamers and higher.

The dimers were separated by further distillation and hydrogenated as described above for Example 1. Characterization data for the resulting methyl paraffins is specified in Table 7 below.

TABLE 7

Methyl paraffin characterization for Example 2

| | |
|---|---|
| Kinematic Viscosity (40° C., ASTM D445) | 2.753 CSt |
| Kinematic Viscosity (100° C., ASTM D445) | 1.167 CSt |
| Viscosity Index (ASTM D2270) | 222 |
| Pour Point (ASTM D5059) | −42° C. |
| Flash Point (ASTMD92-Cleveland open cup) | 135° C. |
| Density (15.6° C.) | 0.78 g/cm$^3$ |
| Density (80° C.) | 0.7335 g/cm$^3$ |
| Thermal Conductivity (80° C.) | 0.165 W/m · K |
| Total Water | <25 ppm |

Elemental analysis of the product by ICP is shown below in Table 8, which shows that highly pure methyl paraffin products were obtained. Notably, potential corrosion-causing ions were absent.

TABLE 8

| | |
|---|---|
| Total sulfur | <0.1 ppm |
| Cl | <50 ppm |
| Na | <3 ppm |
| B | <4 ppm |
| Al | <0.2 ppm |
| Ca | <3.5 ppm |
| Co | <0.2 ppm |
| Cr | <0.2 ppm |

Example 3: $C_{16}$ Methyl Paraffins Formed with Pentamethylcyclopentadienyl(1-methyl-1,5,6,7-tetrahydro-s-indacenyl)hafnium Dimethyl. A commercial feed comprising ~93% $C_8$ LAOs was treated with AZ-300 adsorbent, a homogeneous combination of activated alumina and molecular sieve adsorbents, to remove oxygenates, moisture and other contaminants. The LAOs were then oligomerized under homogeneous conditions in the presence of a catalyst system comprising pentamethylcyclopentadienyl(1-methyl-1,5,6,7-tetrahydro-s-indacenyl)hafnium dimethyl and N,N-dimethylanilinium tetrakis(pentafluorophenyl)borate as the activator. Oligomerization was conducted using a continuous polymerization unit with a continuous stirred-tank reactor (CSTR). The catalyst system was prepared by mixing 1 g of pentamethylcyclopentadienyl(1-methyl-1,5,6,7-tetrahydro-s-indacenyl)hafnium dimethyl with 394 g of dewatered toluene containing 10-15 ppm of tri-n-octylaluminum, mixing for 10 minutes, adding 1.57 g of N,N-dimethylanilinium tetrakis(pentafluorophenyl)borate, and then mixing for a further 10 minutes. Process conditions and results are specified in Table 9 below.

TABLE 9

Process conditions and results for Example 3

| | |
|---|---|
| Molar ratio of Hf:B | ~1:1 |
| Weight ratio of LAO:Hf | ~65,500:1 |
| Residence time (hrs) | ~3 |
| Temperature (° C.) | ~135-140 |
| Dimer selectivity (%) | ~82 |
| Conversion (%) | ~78-88 |

Upon completion of the reaction, the reaction mixture was filtered through diatomaceous earth to remove the catalyst system, and the filtrate was distilled to remove unconverted $C_8$ LAOs. Vinylidene olefin dimers were obtained as the principal reaction product, as determined after distillation of the uncoverted $C_8$ LAOS, along with minor amounts of trimers and tetramers. The product distribution by weight was 83% dimers, 13% trimers and 4% tetramers. The vinylidene olefin dimers were purified to 99.87% purity in a further distillation. Trisubstituted olefin dimers were not separated prior to hydrogenation.

The product was further hydrogenated using slurry hydrogenation in the presence of D-49 Ni/Ni monoxide powder catalyst supported on silicon dioxide. The hydrogenation reaction was carried out at approximately 230° C. and approximately 650 psi for about 1 hour. The catalyst charge was approximately 0.5 wt. %. The resulting product contained $C_{16}$ methyl paraffins having the characteristics specified in Table 10 below.

TABLE 10

| Methyl paraffin characterization for Example 3 | |
| --- | --- |
| Kinematic Viscosity (40° C., ASTM D445) | 2.750 CSt |
| Kinematic Viscosity (100° C., ASTM D445) | 1.154 CSt |
| Viscosity Index (ASTM D2270) | 193 |
| Pour Point (ASTM D5059) | −48° C. |
| Flash Point (ASTM D92-Cleveland open cup) | 133° C. |
| Density (15.6° C.) | 0.78 g/cm$^3$ |
| Density (80° C.) | 0.7335 g/cm$^3$ |
| Total Water | <25 ppm |

Elemental analysis of the product by ICP is shown below in Table 11, which shows that highly pure methyl paraffin products were obtained. Notably, potential corrosion-causing ions were absent.

TABLE 11

| Total sulfur | <0.1 ppm |
| --- | --- |
| Cl | <50 ppm |
| Na | <3 ppm |
| B | <4 ppm |
| Al | <0.2 ppm |
| Ca | <3.5 ppm |
| Co | <0.2 ppm |
| Cr | <0.2 ppm |
| Cu | ~0.3 ppm |
| Li | <0.2 ppm |
| Ni | <0.2 ppm |
| Si | <10 ppm |
| Ti | <0.2 ppm |
| P | <3 ppm |

Example 4: $C_{16}$ Methyl Paraffins Formed with Pentamethylcyclopentadienyl(1-isobutyl-1,5,6,7-tetrahydro-s-indenyl)hafnium Dimethyl. This example was carried out in a similar manner to that specified in Example 3, except pentamethylcyclopentadienyl(1-isobutyl-1,5,6,7-tetrahydro-s-indacenyl)hafnium dimethyl was used as the catalyst. Additional process differences included an oligomerization temperature of 145-150° C., a dimer selectivity of ~90%, and an LAO conversion percentage of 85-90%. After distillation to remove unconverted $C_8$ monomer, the product contained ~89 wt. % dimers, ~10 wt. % trimers, and 1 wt. % tetramers.

The dimers were separated by further distillation and hydrogenated as described above for Example 3. A dimer purity of 99.89% was achieved. Characterization data for the resulting methyl paraffins is specified in Table 12 below.

TABLE 12

| Methyl paraffin characterization for Example 4 | |
| --- | --- |
| Kinematic Viscosity (40° C., ASTM D445) | 2.740 CSt |
| Kinematic Viscosity (100° C., ASTM D445) | 1.151 CSt |
| Viscosity Index (ASTM D2270) | 193 |
| Pour Point (ASTM D5059) | −51° C. |
| Flash Point (ASTMD92-Cleveland open cup) | 133° C. |
| Density (15.6° C.) | 0.78 g/cm$^3$ |
| Density (80° C.) | 0.7335 g/cm$^3$ |
| Total Water | <25 ppm |

Elemental analysis of the product by ICP is shown below in Table 13, which shows that highly pure methyl paraffin products were obtained. Notably, potential corrosion-causing ions were absent.

TABLE 13

| Total sulfur | <0.1 ppm |
| --- | --- |
| Cl | <50 ppm |
| Na | <3 ppm |
| B | <4 ppm |
| Al | <0.2 ppm |
| Ca | <3.5 ppm |
| Co | <0.2 ppm |
| Cr | <0.2 ppm |
| Cu | ~0.3 ppm |
| Li | <0.2 ppm |
| Ni | <0.2 ppm |
| Si | <10 ppm |
| Ti | <0.2 ppm |
| P | <3 ppm |

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about."

Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A heat transfer fluid comprising:
one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety, the one or more methyl paraffins containing about 12 to about 24 carbon atoms, and collectively having a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower, wherein the one or more LAO dimers are formed in the presence of an unbridged Hf metallocene catalyst system.

2. The heat transfer fluid of claim 1, wherein the heat transfer fluid comprises at least about 90 wt. % methyl paraffins.

3. The heat transfer fluid of claim 1, wherein the heat transfer fluid comprises at least about 75 wt. % $C_{16}$ methyl paraffins.

4. The heat transfer fluid of claim 1, wherein the one or more methyl paraffins have a pour point ranging from about −48° C. to about −51° C.

5. The heat transfer fluid of claim 1, wherein the one or more LAOs have about 8 to about 12 carbon atoms, and the one or more LAO dimers contain about 16 to about 24 carbon atoms.

6. The heat transfer fluid of claim 1, wherein the one or more LAOs comprise about 93% $C_8$.

7. The heat transfer fluid of claim 1, wherein the one or more methyl paraffins have a pour point of about −45° C. or lower.

8. The heat transfer fluid of claim 1, wherein the fluid has a traction coefficient of less than 0.012 at slide-roll ratio of 50% when measured at 30 N and speed of 2 m/s at 80° C. on a mini-traction machine.

9. The heat transfer fluid of claim 1, wherein a weight ratio of the one or more LAOs to Hf of the unbridged Hf metallocene catalyst system is about 65,000 to 1.

10. A heat-generating component system comprising:
a heat-generating component; and
a heat transfer fluid in contact with the heat-generating component, the heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety, wherein the one or more LAO dimers are formed in the presence of an unbridged Hf metallocene catalyst system;
wherein the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −42° C. or lower.

11. The battery heat-generating component system of claim 10, further comprising:
a heat dissipation structure in fluid communication with the heat transfer fluid wherein the heat-generating component system is configured to circulate the heat transfer fluid between the heat-generating component and the heat dissipation structure.

12. The heat-generating component system of claim 10, wherein the heat transfer fluid comprises at least about 90 wt. % methyl paraffins.

13. The heat-generating component system of claim 10, wherein the heat transfer fluid comprises at least about 75 wt. % $C_{16}$ methyl paraffins.

14. The heat-generating component system of claim 10, wherein the one or more methyl paraffins have a pour point ranging from about −48° C. to about −51° C.

15. The heat-generating component system of claim 10, wherein the one or more LAOs have about 8 to about 12 carbon atoms, and the one or more LAO dimers contain about 16 to about 24 carbon atoms.

16. The heat-generating component system of claim 10, wherein the one or more LAOs comprise about 93% $C_8$.

17. The heat-generating component system of claim 10, further comprising a mechanical system in fluid communication with the heat transfer fluid wherein the heat transfer fluid provides lubrication to mechanical system.

18. A method comprising:
providing a heat transfer fluid comprising one or more methyl paraffins comprising a hydrogenated reaction product of one or more linear alpha olefin (LAO) dimers formed by dimerization of one or more LAOs having about 6 to about 12 carbon atoms and the one or more LAO dimers comprising a vinylidene moiety or a trisubstituted olefin moiety, wherein the one or more LAO dimers are formed in the presence of an unbridged Hf metallocene catalyst system;
wherein the one or more methyl paraffins contain about 12 to about 24 carbon atoms, and collectively have a Mouromtseff Number ranging from about 17,000 to about 27,000 kg/($s^{2.2} \cdot m^{0.6} \cdot K$) at 80° C., a thermal conductivity at 80° C. of about 0.165 W/m·K or higher, a flash point of about 130° C. or higher, and a pour point of about −46° C. or lower; and
operating or placing a heat-generating component in contact with the heat transfer fluid.

19. The method of claim 18, wherein the heat-generating component is a computer, battery, a power component, a motor, a motor component, or any combination thereof.

20. The method of claim 18, further comprising operating or placing a mechanical system component in contact with the heat transfer fluid to provide lubrication to mechanical system.

* * * * *